United States Patent
Rafac

(10) Patent No.: US 11,758,639 B2
(45) Date of Patent: Sep. 12, 2023

(54) DETERMINING MOVING PROPERTIES OF A TARGET IN AN EXTREME ULTRAVIOLET LIGHT SOURCE

(71) Applicant: ASML Netherlands B.V., Veldhoven (NL)

(72) Inventor: Robert Jay Rafac, Encinitas, CA (US)

(73) Assignee: ASML Netherlands B.V., Veldhoven (NL)

( * ) Notice: Subject to any disclaimer, the term of this patent is extended or adjusted under 35 U.S.C. 154(b) by 267 days.

(21) Appl. No.: 17/416,636

(22) PCT Filed: Jan. 27, 2020

(86) PCT No.: PCT/EP2020/051867
§ 371 (c)(1),
(2) Date: Jun. 21, 2021

(87) PCT Pub. No.: WO2020/156975
PCT Pub. Date: Aug. 6, 2020

(65) Prior Publication Data
US 2022/0086998 A1 Mar. 17, 2022

Related U.S. Application Data

(60) Provisional application No. 62/798,725, filed on Jan. 30, 2019.

(51) Int. Cl.
*H05G 2/00* (2006.01)
*G01N 21/64* (2006.01)

(52) U.S. Cl.
CPC ......... *H05G 2/008* (2013.01); *G01N 21/6402* (2013.01); *H05G 2/006* (2013.01)

(58) Field of Classification Search
CPC ..... H05G 2/008; H05G 2/006; G01N 21/6402
See application file for complete search history.

(56) References Cited

U.S. PATENT DOCUMENTS

| 8,872,144 B1 | 10/2014 | Fomenkov |
| 9,778,022 B1 | 10/2017 | Odle et al. |

(Continued)

FOREIGN PATENT DOCUMENTS

WO    2013174620 A1    11/2013

OTHER PUBLICATIONS

Chiara Giovanardi, European Patent Office International Searching Authority, International Search Report and Written Opinion, corresponding PCT Application No. PCT/EP2020/051867, dated May 6, 2020, 13 pages total.

(Continued)

*Primary Examiner* — Nicole M Ippolito
*Assistant Examiner* — Hanway Chang
(74) *Attorney, Agent, or Firm* — DiBerardino McGovern IP Group LLC

(57) ABSTRACT

An apparatus includes: a diagnostic system configured to diagnostically interact with a current target (110c) traveling along a trajectory (TR) and before the current target enters a target space; a first detection apparatus (120) configured to detect first light; a second detection apparatus (130) configured to detect second light; and a control system (150) in communication with the first and second detection apparatuses. The first light includes: light (140) produced from an interaction between the current target and the diagnostic system, and light (142) emitted from a plasma produced by a previous target. The second light includes the light (142) emitted from the plasma produced by the previous target. The control system (150) is configured to: produce an analysis signal based on first and second signals produced from respective outputs of the first and second detection apparatuses; and estimate a property of the current target based on the produced analysis signal.

34 Claims, 14 Drawing Sheets

(56) References Cited

U.S. PATENT DOCUMENTS

| | | |
|---|---|---|
| 10,149,375 B2 | 12/2018 | Price et al. |
| 2005/0199829 A1 | 9/2005 | Partlo et al. |
| 2013/0043401 A1 | 2/2013 | Graham et al. |
| 2015/0083936 A1 | 3/2015 | Wehrens |
| 2015/0179401 A1 | 6/2015 | Gambino et al. |
| 2016/0209753 A1 | 7/2016 | Zhao et al. |
| 2016/0234920 A1 | 8/2016 | Suzuki et al. |
| 2017/0048957 A1 | 2/2017 | Riggs et al. |
| 2017/0048958 A1 | 2/2017 | Riggs et al. |
| 2017/0064799 A1 | 3/2017 | Yabu et al. |
| 2017/0079126 A1 | 3/2017 | Suzuki et al. |
| 2018/0173102 A1 | 6/2018 | Yabu |

OTHER PUBLICATIONS

Robert A. Stern et al., "EUV and Soft X-Ray Quantum Efficiency Measurements of a Thinned Back-Illuminated CMOS Active Sensor," IEEE Electron Device Letters, vol. 32, No. 3, pp. 354-356 (Mar. 2011).

DETERMINING MOVING PROPERTIES OF A TARGET IN AN EXTREME ULTRAVIOLET LIGHT SOURCE

CROSS REFERENCE TO RELATED APPLICATION

This application claims priority to U.S. Application No. 62/798,725, filed Jan. 30, 2019 and titled DETERMINING MOVING PROPERTIES OF A TARGET IN AN EXTREME ULTRAVIOLET LIGHT SOURCE, and which is incorporated herein in its entirety by reference.

TECHNICAL FIELD

The disclosed subject matter relates to a system and method for measuring aspects of a target along its trajectory in a laser produced plasma extreme ultraviolet light source.

BACKGROUND

Extreme ultraviolet (EUV) light, for example, electromagnetic radiation having wavelengths of around 50 nm or less (also sometimes referred to as soft x-rays), and including light at a wavelength of about 13 nm, can be used in photolithography processes to produce extremely small features in substrates, for example, silicon wafers.

Methods to produce EUV light include, but are not necessarily limited to, converting a material that has an element, for example, xenon, lithium, or tin, with an emission line in the EUV range in a plasma state. In one such method, often termed laser produced plasma ("LPP"), the required plasma can be produced by irradiating a target material, for example, in the form of a droplet, plate, tape, stream, or cluster of material, with an amplified light beam that can be referred to as a drive laser. For this process, the plasma is typically produced in a sealed vessel, for example, a vacuum chamber, and monitored using various types of metrology equipment.

SUMMARY

In some general aspects, a method includes enabling an interaction between a diagnostic system and a current target traveling along a trajectory toward a target space, the current target including a component that emits light when converted to plasma. The method also includes detecting first light at a first detection region, detecting second light at a second detection region, producing an analysis signal based on a first signal produced by the detected first light and a second signal produced by the detected second light, and estimating a property of the current target based on the produced analysis signal. The first light includes light emitted from the plasma produced by a previous target and light produced from the enabled interaction between the current target and the diagnostic system. The second light includes the light emitted from the previous target's plasma.

Implementations can include one or more of the following features. For example, the light emitted from the plasma produced by the target component can include: extreme ultraviolet (EUV) light being in the EUV wavelength range and non-EUV light being outside of the EUV wavelength range.

The second light at the second detection region can be detected by suppressing at least a portion of the light produced from the interaction between the current target and the diagnostic system. The light produced from the interaction between the current target and the diagnostic system can be suppressed by filtering the light produced from the interaction between the current target and the diagnostic system based on one or more of: a spectral property, a polarization property, and/or a spatial property of the light produced from the interaction between the current target and the diagnostic system.

The interaction between the current target and the diagnostic system can include: a first interaction between the current target and a first diagnostic probe of the diagnostic system; and a second interaction between the current target and a second diagnostic probe of the diagnostic system. The second interaction between the current target and the second diagnostic probe can occur at a location and time that are distinct from the location and time at which the first interaction between the current target and the first diagnostic probe occurs.

The interaction between the diagnostic system and the current target can be enabled by directing the diagnostic system toward the current target so that the diagnostic system and the current target interact at a region along the current target trajectory. The diagnostic system can be directed toward the current target by directing a diagnostic light beam toward the current target.

The property of the current target can be estimated by estimating one or more of: an arrival time of the current target at a particular position in space; a speed, a velocity, and/or an acceleration of the current target; and a time interval between an arrival of the current target at a particular position in space and an arrival of another target at the particular position in space.

The method can include adjusting one or more properties of a radiation pulse directed toward the target space if the estimated target property is outside an acceptable specification.

The first and second light can be detected by detecting the first and second light during or after a preceding (for example, immediately preceding) target has interacted with the prior radiation pulse.

The light emitted from the previous target's plasma can have a spectral bandwidth that is substantially broader than a spectral bandwidth of the light produced from the interaction between the current target and the diagnostic system. The light produced from the interaction between the current target and the diagnostic system can include light from the diagnostic system that is reflected or scattered from the current target.

The analysis signal can be produced from the first signal and the signal by electronically subtracting the second signal from the first signal. The analysis signal can be produced from the first signal and the second signal by digitizing the first signal and the second signal, and computing a difference between each time-stamped sample of the second digitized signal and the first digitized signal.

The second light at the second detection region can be detected by detecting an amount of the light produced from the enabled interaction between the current target and the diagnostic system. The detected amount of the light produced from the enabled interaction between the current target and the diagnostic system at the second detection region can be less than an amount of the light produced from the enabled interaction between the current target and the diagnostic system that is detected at the first detection region.

In other general aspects, an apparatus includes: a diagnostic system configured to diagnostically interact with a current target traveling along a trajectory and before the current target enters a target space; a first detection apparatus configured to detect first light; a second detection apparatus configured to detect second light; and a control system in communication with the first and second detection apparatuses. The first light includes: light produced from an interaction between the current target and the diagnostic system, and light emitted from a plasma produced by a previous target. The second light includes the light emitted from the plasma produced by the previous target. The control system is configured to: produce an analysis signal based on first and second signals produced from respective outputs of the first and second detection apparatuses; and estimate a property of the current target based on the produced analysis signal.

Implementations can include one or more of the following features. For example, the apparatus can also include a target delivery system configured to release a plurality of targets each along a trajectory toward the target space. Each target includes a component that emits extreme ultraviolet (EUV) light when converted to plasma.

The apparatus can also include an optical source configured to produce radiation pulses directed toward the target space. The plasma produced by the previous target is produced due to an interaction between the previous target and a prior radiation pulse.

The diagnostic system can include a diagnostic light beam, and the diagnostic light produced from the interaction between the current target and the diagnostic light beam can include the diagnostic light beam that is reflected or scattered from the current target.

The first detection apparatus can include a first light detector, and the second detection apparatus can include a second light detector. Each of the first light detector and the second light detector can include one or more: photodiodes, the output of which is a voltage signal related to current produced from the detected light; photo-transistors, light-dependent resistors, and photomultiplier tubes. The first light detector and the second light detector can have approximately equivalent viewing and collection angles. The second detection apparatus can include a blocking device configured to restrict at least most of the light produced from the interaction between the current target and the diagnostic system from reaching the second light detector. The blocking device can include a filter in an optical path between the target space and the second light detector, the filter configured to suppress the light produced from the interaction between the current target and the diagnostic system. The filter can include one or more of: a spectral filter, a polarization filter, and a spatial filter. The first detection apparatus can include a blocking device having a bandpass that overlaps with a wavelength of the light produced from the interaction between the current target and the diagnostic system.

The diagnostic system can include first and second diagnostic probes, each configured to diagnostically interact with the current target as it travels along the trajectory and before entering the target space, each interaction between the current target and a diagnostic probe occurring at a distinct location and a distinct time.

The apparatus can include: an optical source configured to produce a plurality of radiation pulses that are directed toward the target space; and an actuation system in communication with the control system and the optical source. The actuation system can be configured to adjust one or more properties of a radiation pulse directed toward the target space if the estimated property is outside an acceptable specification.

The light produced from the interaction between the current target and the diagnostic system can have a spectral bandwidth that is substantially narrower than the spectral bandwidth of the light emitted from the plasma produced by the previous target.

The control system can include an electronic module in communication with the first and second detection apparatuses, the electronic module configured to electronically subtract the second signal from the first signal.

In other general aspects, a method of estimating a property of a moving target includes releasing a current target along a trajectory toward a target space, the current target including a component that emits light when converted to plasma. The method includes, detecting, at a first detection region, diagnostic light produced from an interaction between the current target and a diagnostic system and background light emitted from the plasma produced by a previous target, the diagnostic light having a substantially narrower spectral bandwidth than the spectral bandwidth of the background light. The method includes restricting an amount of the diagnostic light from passing through to a second detection region and permitting all of the background light to pass through to the second detection region. The method also includes detecting the background light at the second detection region and producing an analysis signal based on: a signal produced by the detected light at the first detection region, and a background signal produced by the detected light at the second detection region. The method includes estimating a property of the current target based on the produced analysis signal.

Implementations can include one or more of the following features. For example, detecting, at the first detection region, diagnostic light and background light and detecting the background light at the second detection region can include detecting the background light at both the first and second detection regions.

The method can also include restricting an amount of background light from passing through to the first detection region. The restriction of the amount of background light passing through to the first detection region can permit a portion of the background light to reach the first detection region, the permitted portion of the background light being on the same scale in power as the diagnostic light that reaches the first detection region.

DESCRIPTION

Figure 1A:
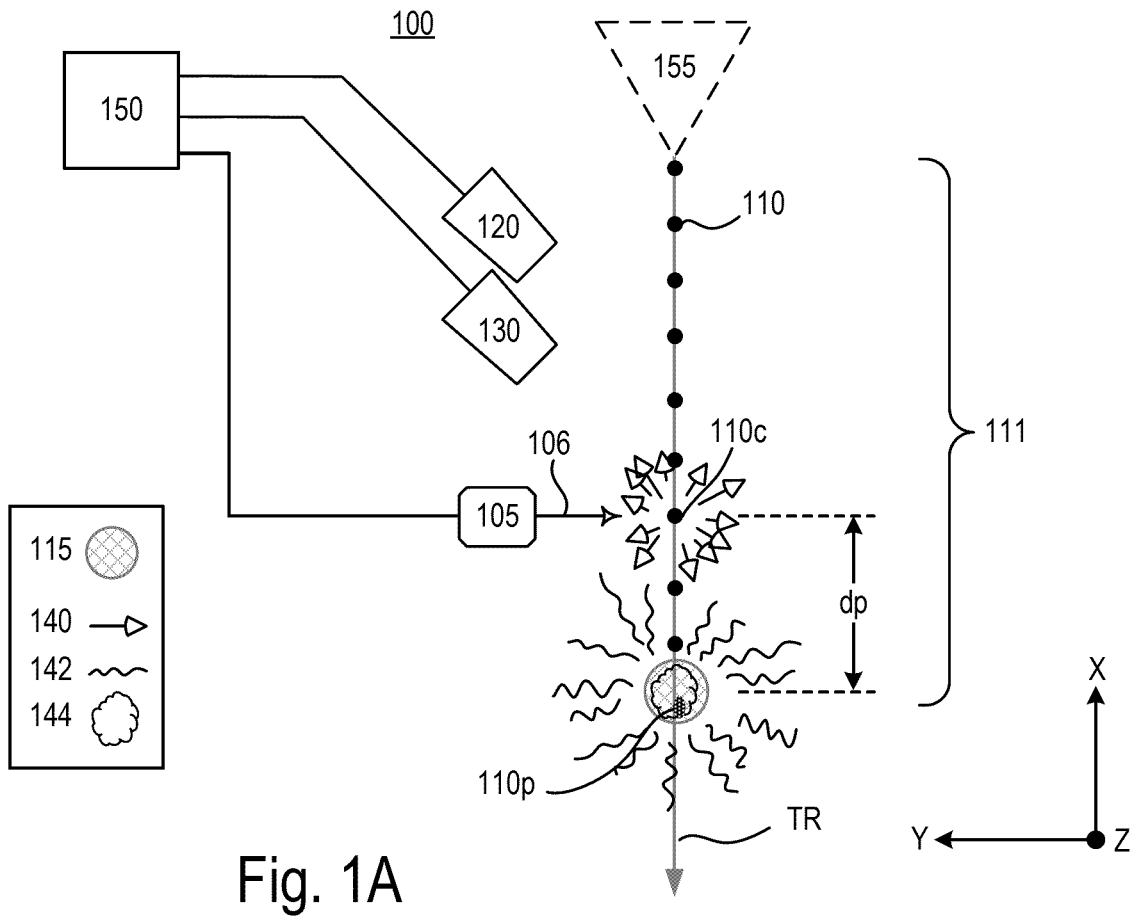
FIG. 1A is a schematic illustration and block diagram of a metrology apparatus including first and second detection apparatuses for determining one or properties of targets directed toward a target space.
Figure 3A:
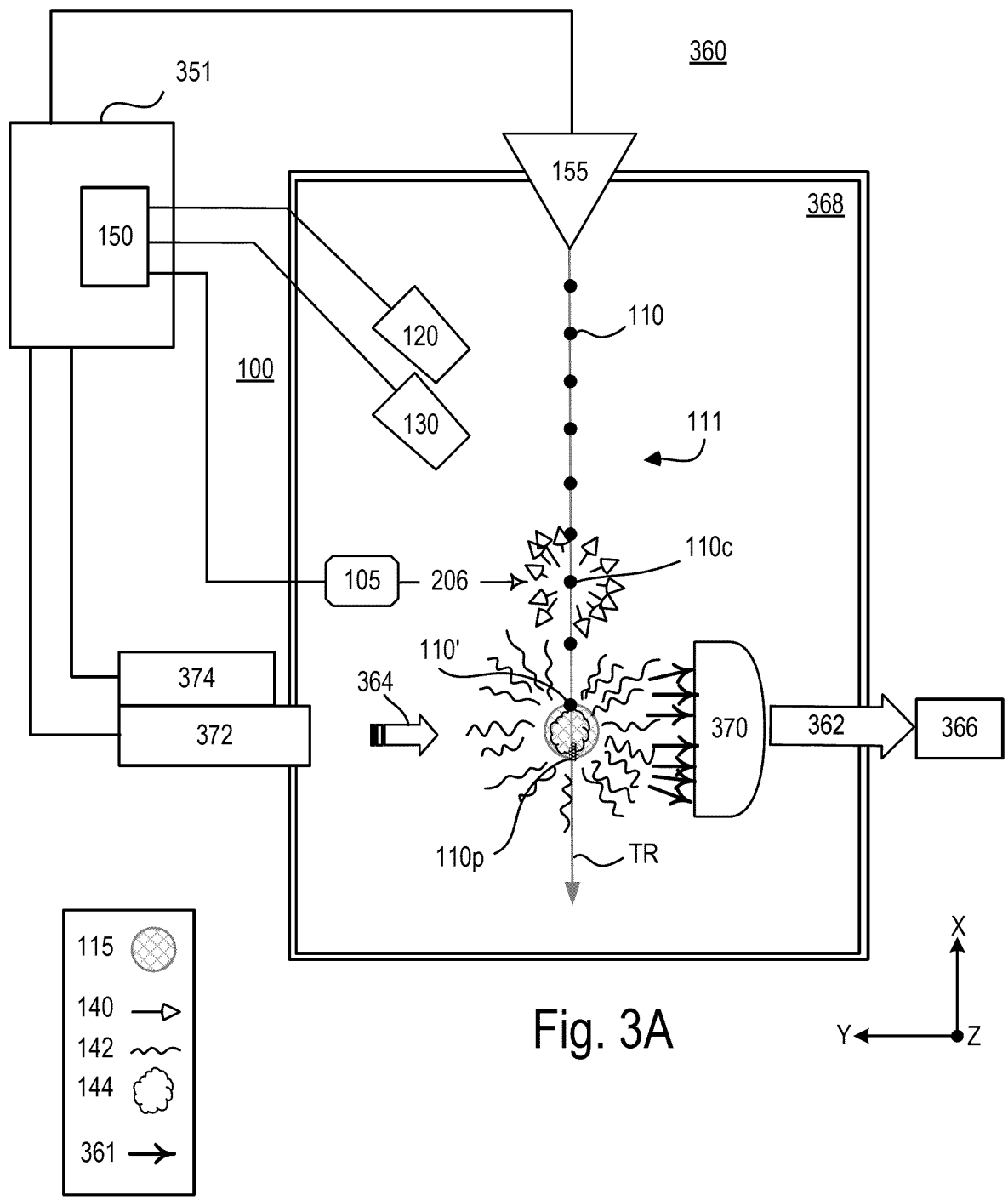
FIG. 3A is a schematic illustration and block diagram of a first view of an implementation of the metrology apparatus of FIG. 1A implemented in an extreme ultraviolet (EUV) light source.
Figure 3B:
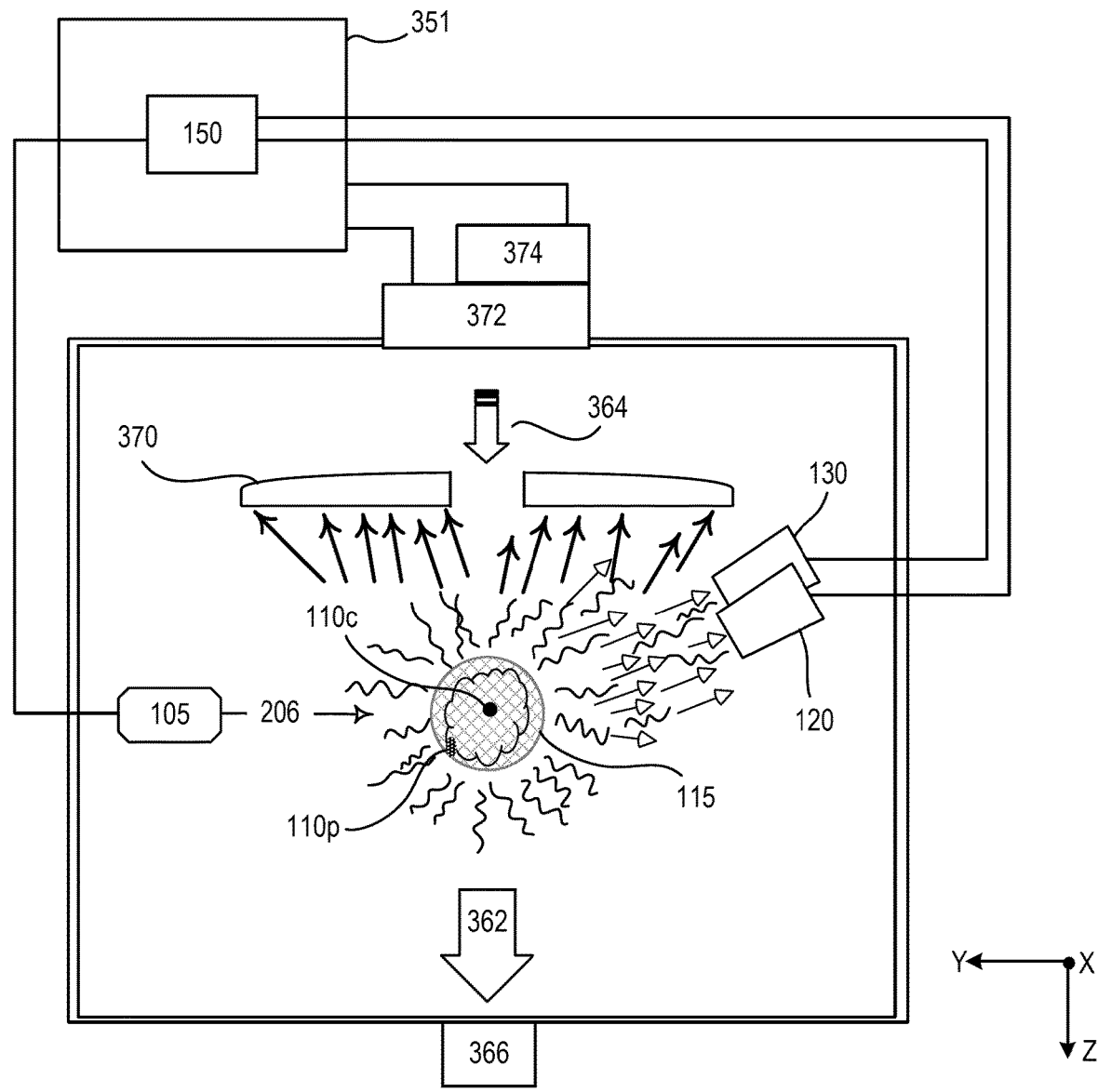
FIG. 3B is a schematic illustration and block diagram of a second view of the implementation of the metrology apparatus of FIG. 1A implemented in an extreme ultraviolet (EUV) light source of FIG. 3A.
Figure 3B:
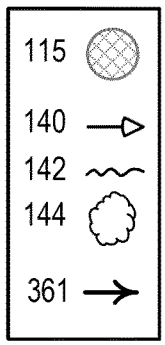

Referring to FIG. 1A, a metrology apparatus 100 includes a diagnostic system 105 configured to produce one or more diagnostic probes 106 that diagnostically interact with a current target 110c traveling along a trajectory TR and before the current target 110c enters a target space 115. The metrology apparatus 100 can be implemented within an EUV light source (such as EUV light source 360 shown in FIGS. 3A and 3B) that uses targets 110 that are at least partly converted to plasma 144 by interacting the targets 110 with radiation pulses 364 (as shown in FIGS. 3A and 3B) in the target space 115.

The trajectory TR generally extends along the -X axis although the trajectory TR can partially overlap with the Z and/or Y axes. The metrology apparatus 100 includes a first detection apparatus 120 configured to detect first light. The first light includes light 140 produced from an interaction between the current target 110c and the diagnostic system 105 as well as light 142 emitted from the plasma 144 produced by one or more previous targets 110p within the target space 115. The previous target 110p is any target that arrives at the target space 115 before the current target 110c arrives at the target space 115. The previous target 110p can be a target that is adjacent to the current target 110c or there could be other targets between the previous target 110p and the current target 110c. In FIG. 1A, the previous target 110p has already produced the plasma 144 because it has already interacted with a radiation pulse in the target space 115, and because of this interaction, the previous target 110p is altered by at least partially being converted to plasma 144. Because of this, the previous target 110p is depicted schematically differently than the current target 110c in FIG. 1A (as well as in FIGS. 2 and 3A). The schematic depiction of the targets 110, the current target 110c, and the previous target 110p in FIGS. 1-3A are merely for illustrative purposes only. The actual geometry, density, and properties of these targets can be different from what is shown in FIGS. 1-3A. For example, the current target 110c could be a shape other than a sphere, and the previous target 110p can take on shapes other than what is shown or can be a dispersed set of particles in space.

The metrology apparatus 100 also includes a control system 150 in communication with the first detection apparatus 120. The control system 150 is configured to estimate one or more properties of the current target 110c based at least on the output from the first detection apparatus 120. The estimated property of the current target 110c can be a property related to the motion, arrival, or position of the current target 110c relative to the target space 115. For example, the control system 150 can estimate one or more of an arrival time of the current target 110c at a particular position in space (such as the target space 115); a speed, a velocity, or an acceleration of the current target 110c; or a time interval between the arrival of the current target 110c at a particular position in space and the arrival of another target at that particular position in space. The determined or estimated properties of the current target 110c can therefore be used by the EUV light source 360 to adjust or control aspects of a subsequent radiation pulse that is directed to the target space 115 to ensure that the subsequent radiation pulse arrives at the target space 115 (or an optimal position within the target space 115) when a present target 110' (which can be the current target 110c) arrives at the target space 115 (see FIGS. 3A and 3B).

A plurality 111 of targets (each generally designated as 110) are directed along the trajectory TR toward the target space 115. Each target 110 includes a component that emits extreme ultraviolet (EUV) light (such as EUV light 361 shown in FIGS. 3A and 3B) when converted to the plasma 144. These targets 110 travel (for example, ballistically) from a region of generation (such as from a target delivery system 155) toward the target space 115. The properties (such as the arrival or motion) of the present target 110' are estimated by probing the current target 110c as it travels along the trajectory TR with the diagnostic probe(s) 106 produced by the diagnostic system 105, detecting aspects of the interaction between the diagnostic probe(s) 106 and the current target 110c, and analyzing these detected aspects, under control of the control system 150.

Unfortunately, a significant amount of broadband optical radiation (that is, the light 142) can be present in the first light that is detected at the first detection apparatus 120, and such light 142 can interfere with the calculation and analysis performed by the control system 150. This interference occurs because the plasma 144 is produced by one or more previous targets 110p that entered the target space 115 before the current target 110c is interacted with the diagnostic probe(s) 106 and this plasma 144 emits the broadband optical radiation 142. Thus, this broadband optical radiation 142 is also referred to as the plasma flash leakage signal. The intensity of the broadband optical radiation 142 is much greater than the intensity of the light 140. Because of this, the broadband optical radiation 142 interferes with the signal produced from the direct interaction between the diagnostic probe(s) 106 and the current target 110c. Accordingly, the first detection apparatus 120 detects both the (wanted signal) light 140 produced from the interaction between the current target 110c and the diagnostic probe(s) 106 as well as the (unwanted signal) light 142 emitted from the plasma 144 produced by one or more previous targets 110p.

The broadband optical radiation 142 is largely unpolarized. Moreover, the broadband optical radiation 142 tends to include three distinct wavelength bands, as follows. The broadband optical radiation 142 includes EUV light (such as the EUV light 361 that is collected in the EUV light source 361 shown in FIGS. 3A and 3B). This EUV light has a wavelength range of around 50 nm or less. The broadband optical radiation 142 also includes light having a wavelength range that overlaps with the wavelength of the light 140 that is produced due to the interaction of the diagnostic probe(s) 106 and the targets 110. Lastly, the broadband optical radiation 142 includes light having a wavelength range that includes the range of the wavelength that can be detected by the first detection apparatus 120.

The metrology apparatus 100 is designed to effectively suppress the effect of the broadband optical radiation 142 emitted from the plasma 144 produced by one or more previous targets 110p on the calculation and analysis performed by the control system 150 to determine the properties of the current target 110c and to thereby estimate characteristics of the present target 110'. The metrology apparatus 100, and specifically the control system 150, is able to suppress the effect of the broadband optical radiation 142 on the calculation to determine the properties of the current target 110c by directly preventing or reducing the amount of the light 140 produced from the interaction between the current target 110c and the diagnostic probe 106 from reaching a second detection apparatus 130 that is arranged near the first detection apparatus 120. In this way, the second detection apparatus 130 is configured to detect second light that includes relatively more of (or substantially only) the broadband optical radiation 142 emitted from the plasma 144 produced by the previous target 110p. The second light therefore has much less of (or none of if the blocking is perfect) the light 140 produced due to the interaction between the current target 110c and the diagnostic probe(s) 106. The second detection apparatus 130 therefore obtains a very good representation of the unwanted plasma flash leakage signal that contributes to the noise present in the signal detected at the first detection apparatus 120.

To put this another way, the first detection apparatus 120 and the second detection apparatus 130 are configured or placed to receive both the light 140 produced due to the interaction between the current target 110c and the diagnostic probe(s) 106 and the broadband optical radiation 142. The difference is that the first detection apparatus 120 is more sensitive to the light 140 and the second detection apparatus 130 is more sensitive to the broadband optical radiation 142.

The control system 150 is in communication with the second detection apparatus 130 to receive the output from the second detection apparatus 130 at the same time that the control system 150 is receiving the output from the first detection apparatus 120. The control system 150 subtracts or removes the signal that is output by the second detection apparatus 130 (which is a good representation of the noise) from the signal output by the first detection apparatus 120 to obtain a substantially noise-free representation of the light 140 produced from the interaction between the current target 110c and the diagnostic probe(s) 106, as discussed in greater detail with reference to FIGS. 7 and 8. In this way, the metrology apparatus 100 is able to accurately and efficiently estimate the property of the current target 110c relative to a prior design that used only the output from a single detection apparatus.

Moreover, the metrology apparatus 100 effectively reduces or eliminates the noise due to the unwanted plasma flash leakage signal (the broadband optical radiation 142) without the need to impose time gating or other geometrical requirements that may require more careful alignment between the diagnostic probe(s) 106 and the current target 110c. Additionally, the metrology apparatus 100 does not require (or perform) an analysis that would require a full suppression of the signal from the broadband optical radiation 142 emitted from the plasma 144 produced by the previous target 110p. That is, both the first detection apparatus 120 and the second detection apparatus 130 receive the unwanted plasma flash leakage signal from the broadband optical radiation 142. The metrology apparatus 100 does not require removal of the spectral components from the broadband optical radiation 142. Indeed, it is quite difficult if not impossible to remove all the spectral components of the broadband optical radiation 142 and some of the broadband optical radiation 142 would nevertheless leak through any bandpass filter that could be used. The metrology apparatus 100 does not require that the broadband optical radiation 142 be largely blocked or removed.

In general, the light 140 produced from the interaction between the current target 110c and the diagnostic probe(s) 106 has a spectral bandwidth that is substantially narrower than the spectral bandwidth of the light 142 emitted from the plasma 144 produced by the previous target 110p. The light 142 is therefore referred to as broadband optical radiation. For example, the spectral bandwidth of the light 140 can be several hundred times lower than the overall spectral bandwidth of the light 142.

The designation of "first light" and "second light" with reference to the respective first detection apparatus 120 and the second detection apparatus 130 does not imply a particular order in time at which light reaches the respective first and second detection apparatuses 120, 130. The terms "first" and "second" are used merely to distinguish between the two different apparatuses 120, 130, and do not convey any information relating to timing of the first light and the second light. For example, the first light (detected by the first detection apparatus 120) can occur at and be detected at the first detection apparatus 120 at the same time that the second detection apparatus 130 detects the second light. Alternatively, the first light can arrive at the first detection apparatus 120 either prior to or subsequent to the time at which the second light arrives at the second detection apparatus 130.

The amount of broadband optical radiation 142 that is present in the first light (detected by the first detection apparatus 120) increases as a distance dp between the diagnostic probe 106 and the target space 115 is reduced. The metrology apparatus 100 enables probing of the current target 110c in situations in which the distance dp is reduced. Furthermore, it is beneficial to ensure that the distance dp between the one or more diagnostic probes 106 and the target space 115 is low enough to account for an impulsive deceleration of the current target 110c as it approaches the target space 115. An impulsive deceleration of the current target 110c occurs due to forces from the plasma 144 produced by one or more previous targets 110p. Moreover, these impulsive forces drop in amplitude with an increase in the distance from the target space 115. Thus, in some implementations, the diagnostic probes 106 is placed at a distance dp that is close enough to the target space 115 to measure or account for the deceleration to the current target 110c.

Figure 1B:
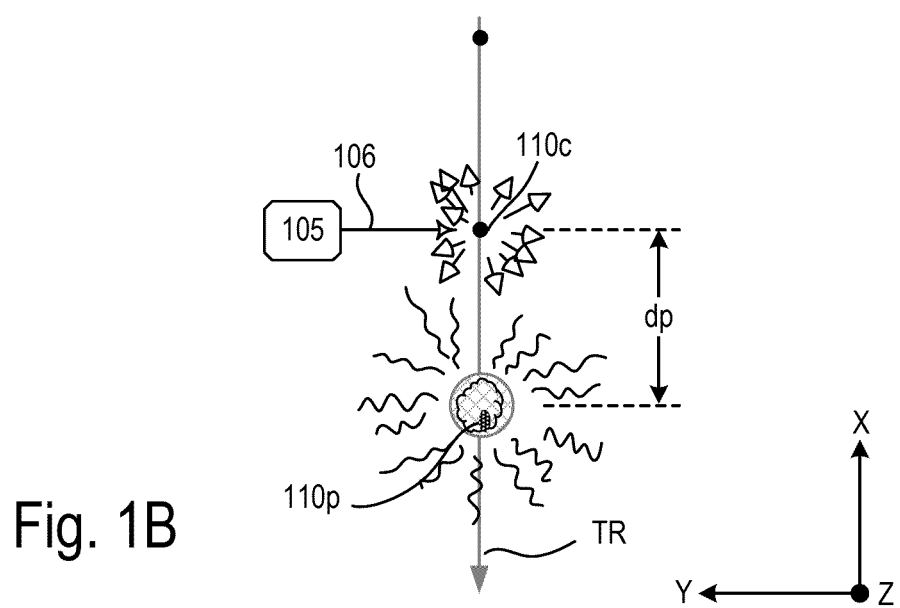
FIG. 1B is a schematic illustration of an implementation of a diagnostic region at which a diagnostic probe interacts with each target and the target space.

For example, in order to accurately adjust aspects of the subsequent radiation pulse that will interact with the present target 110' (which can be the current target 110c) in the target space 115, the motion of the current target 110c needs to be estimated. To a first approximation, the position of the current target 110c is related to a starting position, a velocity of the current target 110c, and an acceleration of the current target 110c. For this first approximation to be a good assumption, the velocity and acceleration should be substantially constant. In some cases, it can be assumed that the acceleration is zero (0). The velocity of the current target 110c changes (in this example, it decelerates) after the preceding plasma event (that occurs when the previous target 110p interacts with the prior radiation pulse) because there is an impulsive deceleration of the current target 110c due to the forces from the plasma 144. Because of this, as shown in the implementation of FIG. 1B, it is beneficial to measure the property (such as the velocity) of the current target 110c after the last impulsive event, that is, after or during a preceding previous target 110p (which can be the immediately preceding previous target) has interacted with the prior radiation pulse. After the interaction between the preceding previous target 110p and the prior radiation pulse, the current target 110c rapidly decelerates, and then as the deceleration drops substantially after a short period of time, the velocity of the current target 110c can be considered essentially constant. The current target 110c decelerates from a velocity (before the plasma is produced from the previous target 110p) to a current velocity. Because the diagnostic probe 106 is close enough to the target space 115 (and the plasma 144 produced by the interaction of the preceding previous target 110p and the prior radiation pulse), it is safe to assume that no other forces act to alter the current target 110c and the estimate of the property of the current target 110c is more accurate. The metrology apparatus 100 is therefore even more useful in this implementation described in FIG. 1B, in which the first detection apparatus 120 detects not only the diagnostic light (the light 140) but also the broadband optical radiation 142, which has a relatively higher intensity and therefore substantially interferes with the light 140 due to the fact that the diagnostic probe 106 is so close to the plasma 144. Indeed, it becomes more difficult to spatially filter the broadband optical radiation 142 from the light 140 because the intensity of the broadband optical radiation 142 is greater relative to the light 140 in situations in which the diagnostic probe 106 is closer to the target space 115 and therefore the plasma 144.

Figure 2:
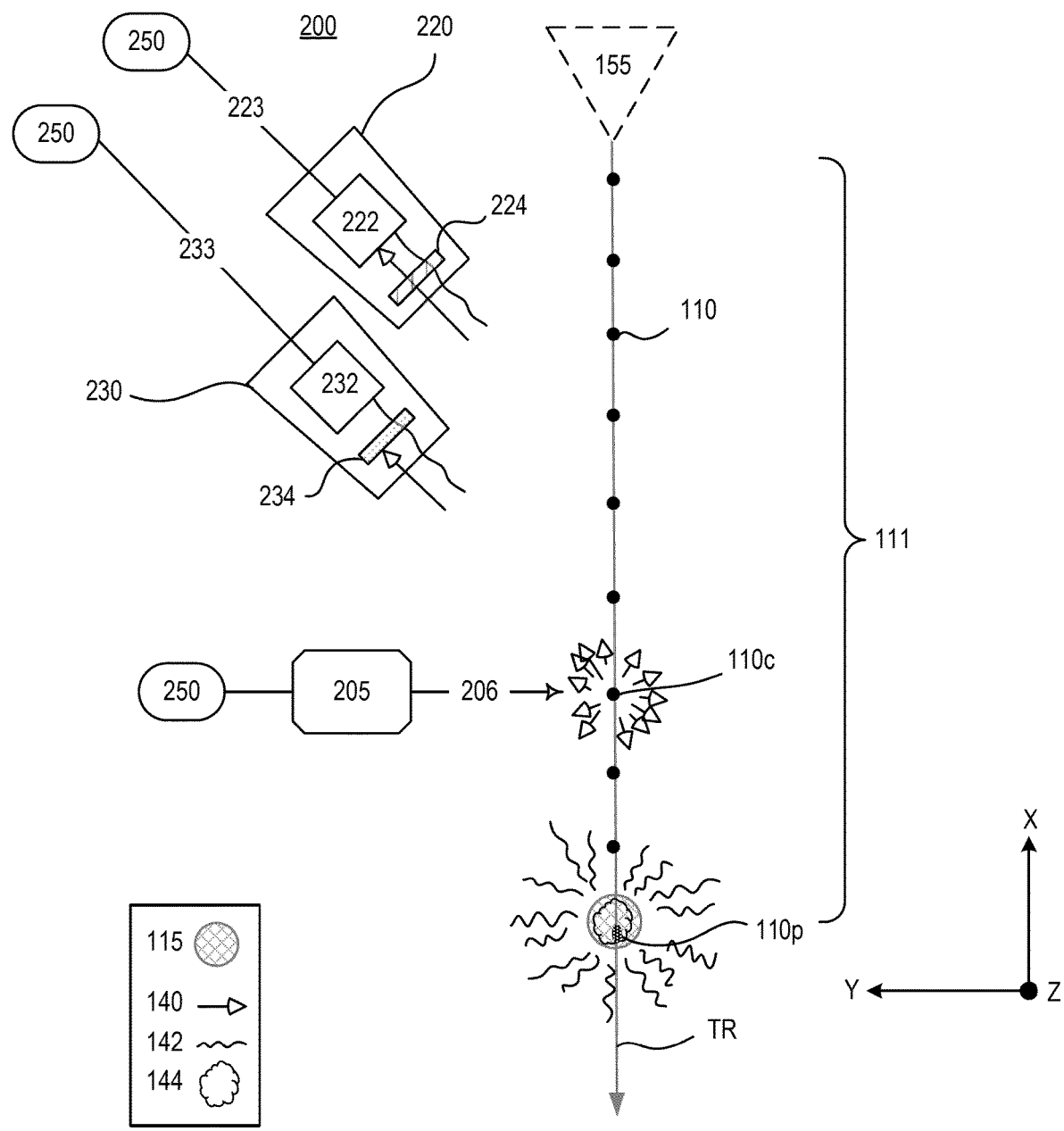
FIG. 2 is a schematic illustration and block diagram of an implementation of the metrology apparatus of FIG. 1A.

Referring to FIG. 2, an implementation of the metrology apparatus 200 is shown. The metrology apparatus 200 includes first and second detection apparatuses 220, 230 in communication with a control system 250. The first detection apparatus 220 includes a first light detector 222, and the second detection apparatus 230 includes a second light detector 232. Each of the first light detector 222 and the second light detector 232 can include one or more of a photodiode, a photo-transistor, a light-dependent resistor, and a photomultiplier tube. In other implementations, each of the first light detector 222 and the second light detector 232 includes one or more thermal detectors such as a pyroelectric detector, a bolometer, or a calibrated charged coupled device (CCD) or CMOS.

The output of the first light detector 222 and the second light detector 232 is a respective signal 223, 233 (such as a voltage signal) related to current produced from the detected light at the respective first light detector 222 and the second light detector 232. The first light detector 222 and the second light detector 232 have approximately equivalent viewing and collection angles. For example, the viewing and collection angles of the first light detector 222 and the second light detector 232 can be approximately equivalent in the XYZ coordinate system. It can be assumed that the first light detector 222 is a linear detector such that the signal output by the first light detector 222 is a linear superposition of the signal associated with the light 140 and signal associated with the broadband optical radiation 142. Similarly, it can be assumed that the second light detector 232 is a linear detector as well.

In some implementations, the first and second light detectors 222, 232 detect or sense light using the same mechanism. In other implementations, the first and second light detectors 222, 232 detect or sense light using different mechanisms. Both of the first and second light detectors 222, 232 should detect light based on the same dependence so that the control system 250 can perform the analysis on the signals 223, 233 output, respectively, from the detectors 222, 232.

The diagnostic system 205 produces as the diagnostic probe 106 a diagnostic light beam 206. The diagnostic light beam 206 is directed toward the trajectory TR such that when the current target 110c passes across the diagnostic light beam 206, the light 140 is produced. In some implementations, the diagnostic light beam 206 has a center wavelength in the near infrared region. For example, the light 140 can be a portion of the diagnostic light beam 206 that is reflected from or scattered from the current target 110c. The first detection apparatus 220 includes a blocking device 224 that can be a spectral filter having transmission range that includes the wavelength of the light 140 produced from the interaction between the current target 110c and the diagnostic light beam 206. For example, as shown, the blocking device 224 can be a bandpass filter having a bandpass $\Delta\lambda$ centered on the wavelength of the diagnostic light beam 206 of the diagnostic system 205. As discussed above, the blocking device 224 is not able to suppress all of the broadband optical radiation 142 and thus at least a significant portion of this broadband optical radiation 142 leaks through the blocking device 224 and reaches the first light detector 222.

The second detection apparatus 230 includes a blocking device 234 as well. The blocking device 234 is configured to restrict at least some (or most) of the light 140 produced from the interaction between the current target 110c and the diagnostic light beam 206 from reaching the second light detector 232. For example, the blocking device 234 can include a spectral filter in an optical path between the target space 115 and the second light detector 232, the spectral filter configured to suppress the light 140 produced from the interaction between the current target 110c and the diagnostic light beam 206. For example, the blocking device 234 can be a bandpass filter having a bandpass $\Delta\lambda$ that is detuned by a certain amount (such as about 20-50 nanometers (nm)) from a center wavelength of the diagnostic light beam 206. Because the light 140 produced from the interaction between the diagnostic light beam 206 and the current target 110c is weak and spectrally narrow (especially relative to the light 142), it is possible to block or greatly suppress the light 140 to below an acceptable noise level with the blocking device 234. Moreover, because the broadband optical radiation 142 is spectrally quite broad (especially relative to the light 140), and is also slowly varying in the near infrared range, the same amount of light power leaks through to the second light detector 232 from the broadband optical radiation 142 as through to the first light detector 222 from the broadband optical radiation 142.

The signal that is sampled by the second detector 232 is in a different spectral band (or wavelength range) and is also in a different spatial location from the signal that is sampled by the first detector 222. Nevertheless, it can be assumed that the signal sampled by the second detector 232 has the same time dependence as the signal sampled by the first detector 222.

In some implementations, the blocking device 224 is a separate structure from the first light detector 222 and the blocking device 224 operates independently of the first light detector 222, and the blocking device 234 is a separate structure from the second light detector 232 and the blocking device 234 operates independently of the second light detector 232. This is what is shown in FIG. 2. It is alternatively possible for the blocking device 224 and the first light detector 222 to be integrated into a single or unitary device, and for the blocking device 234 and the second light detector 232 to be integrated into a single or unitary device. For example, a unitary device could be a sensor that only senses light of a particular polarization or a particular wavelength range.

Next, a general description of an EUV light source 360, in which the metrology apparatus 100 (or 200) is implemented, is provided followed by a discussion of other components of the metrology apparatus 100 or 200 before a detailed discussion of the operation of the metrology apparatus 100 or 200.

Referring to FIGS. 3A and 3B, the metrology apparatus 100 (or 200) is implemented in the EUV light source 360 to measure one or more properties of targets 110. The EUV light source 360 includes the target delivery system 155 that produces the plurality 111 of targets 110. The EUV light source 360 supplies EUV light 362 that has been produced by an interaction between a target 110 and a radiation pulse 364 to an output apparatus 366. As discussed above, the metrology apparatus 100 (or 200) measures and analyzes one or more moving properties (such as speed, velocity, and acceleration) of the current target 110c as the current target 110c travels along the trajectory TR toward the target space 115. The target space 115 is defined within a chamber 368 of the EUV light source 360. The trajectory TR extends along a direction that can be considered as a target (or axial) direction, which lies in a three-dimensional X, Y, Z coordinate system that is defined by the chamber 368. As discussed above, the axial direction of a target 110 generally has a component that is parallel with the −X direction of the coordinate system of the chamber 368. However, the axial direction of the target 110 also can have components along one or more of the directions Y and Z that are perpendicular to the −X direction. Additionally, each target 110 released by the target delivery system 155 can have a slightly different actual trajectory and the trajectory depends on the physical properties of the target delivery system 155 at the time of release of the target 110 as well as the environment within the chamber 368.

The EUV light source 360 generally includes an EUV light collector 370, an optical source 372, an actuation system 374 in communication with the optical source 372, and a control apparatus 351 in communication with the control system 150 as well as the target delivery system 155, the optical source 372, and the actuation system 374.

The EUV light collector 370 collects as much EUV light 361 emitted from the plasma 144 as possible and redirects that EUV light 361 as collected EUV light 362 toward the output apparatus 366. The light collector 370 can be a reflective optical device such as a curved mirror that is able to reflect light having EUV wavelength (that is, the EUV light 361) to form the produced EUV light 362.

The optical source 372 produces a beam of radiation pulses 364 and directs the beam of radiation pulses 364 to the target space 115 generally along the Z direction (although the beam of radiation pulses 364 can be at an angle relative to the Z direction). In FIG. 3A, which is a schematic representation, the beam of radiation pulses 364 is shown as being directed along the −Y direction. The optical source 372 includes a light source that produces radiation pulses 364, a beam delivery system that includes optical steering components that change a direction or angle of the beam of radiation pulses 364, and a focus assembly that focuses the beam of radiation pulses 364 to the target space 115. Exemplary optical steering components include optical elements such as lenses and mirrors that steer or direct the beam of radiation pulses 364 by refraction or reflection, as needed. The actuation system 374 can be used to control or move the various features of the optical components of the beam delivery system and the focus assembly as well as adjust aspects of the light source that produces the radiation pulses 364. An implementation of the optical source 372 is discussed below with reference to FIG. 5.

The actuation system 374 is coupled to components of the optical source 372 and also in communication with and under control of the control apparatus 351. The actuation system 374 is able to modify or control a relative position between a radiation pulse 364 and the target 110 in the target space 115. For example, the actuation system 374 is configured to adjust one or more of a timing of a release of the radiation pulse 364 and a direction at which the radiation pulse 364 travels.

The target delivery system 155 is configured to release a stream (or plurality 111) of targets 110 at a particular rate. The metrology apparatus 100 takes this rate into account when determining the total amount of time needed to perform the measurement and analysis on the moving property (or properties) of the current target 110c as well as affecting a change to other aspects or components of the EUV light source 360 based on the measurement and analysis. For example, the control system 150 can communicate the results of the measurement and analysis to the control apparatus 351, which determines how to adjust one or more signals to the actuation system 374 to thereby adjust one or more characteristics of the radiation pulse 364 directed to the target space 115.

The adjustment to the one or more characteristics of the radiation pulse 364 can improve a relative alignment between a present target 110' and the radiation pulse 364 in the target space 115. The present target 110' is the target that has entered the target space 115 at the time that the radiation pulse 364 (which has just been adjusted) arrives in the target space 115. Such adjustment to the one or more characteristics of the radiation pulse 364 improves the interaction between the present target 110' and the radiation pulse 364 and increases the amount of EUV light 361 produced by such interaction. As shown in FIG. 3A, a previous target 110p has already interacted with a prior radiation pulse (not shown) to produce plasma 144 that emits the light 142.

In some implementations, the present target 110' is the current target 110c. In these implementations, the adjustment to the one or more characteristics of the radiation pulse 364 happens in a relatively shorter time frame. A relatively shorter time frame means that the one or more characteristics of the radiation pulse 364 are adjusted during the time after the analysis of the moving properties of the current target 110c is completed to the time that the current target 110c enters the target space 115. Because the one or more characteristics of the radiation pulse 364 are able to be adjusted in the relatively shorter time frame, there is enough time to affect the interaction between the current target 110c (the moving properties of which have just been analyzed) and the radiation pulse 364.

In other implementations, the present target 110' is another target, that is, a target other than the current target 110c, and following the current target 110c in time. In these implementations, the adjustment to the one or more characteristics of the radiation pulse 364 happens in a relatively longer time frame such that it is not feasible to affect the interaction between the current target 110c (the moving properties of which have just been analyzed) and the radiation pulse 364. On the other hand, it is feasible to affect the interaction between the other (or later) target and the radiation pulse 364. A relatively longer time frame is a time frame that is greater than the time after the analysis of the moving properties of the current target 110c is completed to the time that the current target 110c enters the target space 115. Depending on the relatively longer time frame, the other target could be adjacent to the current target 110c. Or, the other target could be adjacent to an intermediate target that is adjacent to the current target 110c. In these other implementations, an assumption is made that the other target (which is not the current target 110c) is traveling with a moving property that is similar enough to the detected or estimated moving property of the current target 110c.

Each of the targets 110 (including the previous target 110p and the current target 110c, and all other targets produced by the target delivery system 155) includes a material that emits EUV light when converted to plasma. Each target 110 is converted at least partially or mostly to plasma through interaction with the radiation pulse 364 produced by the optical source 372 within the target space 115. Each target 110 produced by the target delivery system 155 is a target mixture that includes the target material and optionally impurities such as non-target particles. The target material is the substance that is capable of being converted to a plasma state that has an emission line in the EUV range. The target 110 can be, for example, a droplet of liquid or molten metal, a portion of a liquid stream, solid particles or clusters, solid particles contained within liquid droplets, a foam of target material, or solid particles contained within a portion of a liquid stream. The target material can include, for example, water, tin, lithium, xenon, or any material that, when converted to a plasma state, has an emission line in the EUV range. For example, the target material can be the element tin, which can be used as pure tin (Sn); as a tin compound such as SnBr4, SnBr2, SnH4; as a tin alloy such as tin-gallium alloys, tin-indium alloys, tin-indium-gallium alloys, or any combination of these alloys. In the situation in which there are no impurities, then each target 110 includes only the target material. The discussion provided herein is an example in which each target 110 is a droplet made of molten metal such as tin. However, each target 110 produced by the target delivery system 155 can take other forms.

The target 110 can be provided to the target space 115 by passing molten target material through a nozzle of the target delivery system 155, and allowing the target 110 to drift along the trajectory TR into the target space 115. In some implementations, the target 110 can be directed to the target space 115 by force. As discussed below, the present target 110' (which can be the current target 110c) that interacts with the radiation pulse 364 can also have already interacted with one or more prior radiation pulses. Or, the present target 110' that interacts with the radiation pulse 364 can reach the target space 115 without having interacted with any other radiation pulses.

Figure 4:
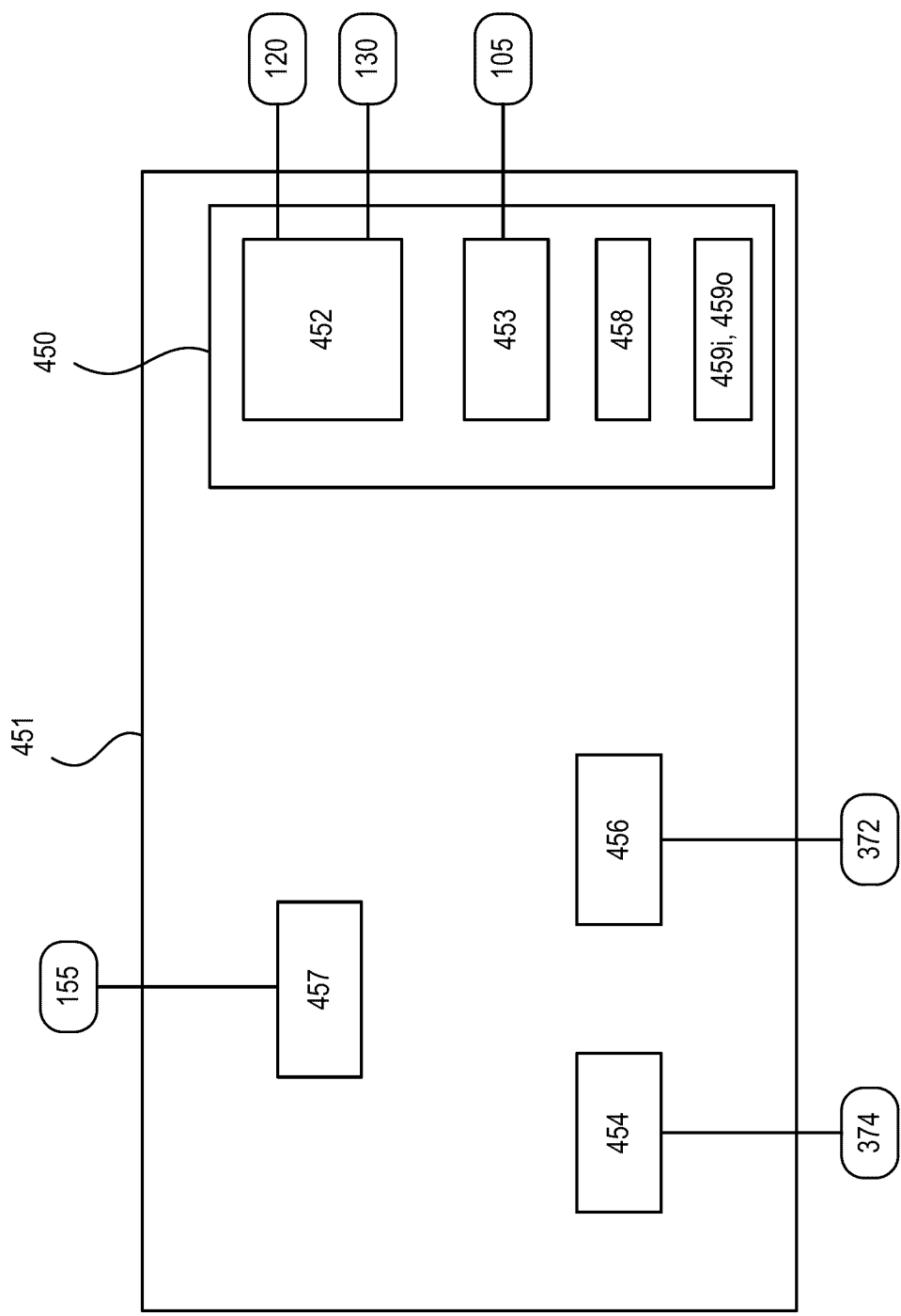
FIG. 4 is a block diagram of an implementation of a control apparatus of the EUV light source of FIGS. 3A and 3B that also includes an implementation of a control system of the metrology apparatus of FIGS. 1A or 2.

The control apparatus 351 communicates with the control system 150 and also communicates with other components (such as the actuation system 374, the target delivery system 355, and the optical source 372) of the EUV light source 360. Referring to FIG. 4, an implementation 451 of the control apparatus 351 is shown and an implementation 450 of the control system 150 is shown. The control apparatus 451 includes the control system 450, but it is possible for the control system 450 to be physically separate from the control apparatus 451 and still remain in communication. Moreover, features or components of the control apparatus 451 can be shared with the control system 450, including features not shown in FIG. 4.

The control system 450 includes a signal processing module 452 configured to receive the output from the first detection apparatus 120 and the output from the second detection apparatus 130. The control system 450 includes a diagnostic control module 453 in communication with the diagnostic system 105. For example, the signal processing module 452 receives the signal 223 from the first light detector 222 and the signal 233 from the second light detector 232, where the signals 223, 233 are voltage signals related to current produced from the detected light at the respective first light detector 222 and the second light detector 232. Generally, the signal processing module 452 analyzes the outputs from the first and second detection apparatuses 120, 130, and determines one or more moving properties of the current target 110c based on this analysis. The diagnostic control module 453 controls operation of the diagnostic system 105. For example, the diagnostic control module 453 can provide a signal to the diagnostic system 105 for adjusting one or more characteristics of the diagnostic system 105 and also for adjusting one or more characteristics of the diagnostic probe(s) 106.

The signal processing module 452 also determines whether an adjustment needs to be made to a subsequent radiation pulse 364 output from the optical source 372 based on the determination of the one or more moving properties of the current target 110c. And, if an adjustment is needed, the signal processing module 452 sends an appropriate signal to an optical source actuation module 454, which interfaces with the optical source 372. The optical source actuation module 454 can be within the control apparatus 451 (as shown in FIG. 4) or it can be integrated within the control system 450.

The signal processing module 452 can include one or more field-programmable hardware circuits, such as field-programmable gate arrays (FPGAs). A FPGA is an integrated circuit designed to be configured by a customer or a designer after manufacturing. The field-programmable hardware circuit can be dedicated hardware that receives the value or values of the time stamps, performs a calculation on the received values, and uses one or more lookup tables to estimate a time of arrival of the present target 110' at the target space 115. In particular, the field-programmable hardware circuit can be used to quickly perform a calculation to enable the adjustment to the one or more characteristics of the radiation pulse 364 in the relatively shorter time frame to enable the adjustment of the one or more characteristics of the radiation pulse 364 that interacts with the current target 110c, the moving properties of which have just been analyzed by the signal processing module 452.

The control apparatus 451 also includes an optical source module 456 configured to interface with components of the optical source 372 including the beam delivery system and the focus assembly as well as any optical amplifiers. The control apparatus 451 includes a target delivery module 457 configured to interface with the target delivery system 155. Moreover, the control apparatus 451 and the control system 450 can include other modules specifically configured to interface with other components of the EUV light source 100 not shown.

The control system 450 generally includes or has access to one or more of digital electronic circuitry, computer hardware, firmware, and software. For example, the control system 450 can have access to memory 458, which can be read-only memory and/or random access memory. Storage devices suitable for tangibly embodying computer program instructions and data include all forms of non-volatile memory, including, by way of example, semiconductor memory devices, such as EPROM, EEPROM, and flash memory devices; magnetic disks such as internal hard disks and removable disks; magneto-optical disks; and CD-ROM disks. The control system 450 can also include or interface with one or more input devices 459$i$ (such as a keyboard, touch screen, microphone, mouse, hand-held input device, etc.) and one or more output devices 459$o$ (such as speakers and monitors).

The control system 450 can also include or have access to one or more programmable processors, and one or more computer program products tangibly embodied in a machine-readable storage device for execution by a programmable processor. The one or more programmable processors can each execute a program of instructions to perform desired functions by operating on input data and generating appropriate output. Generally, the processor receives instructions and data from memory 458. Any of the foregoing may be supplemented by, or incorporated in, specially designed ASICs (application-specific integrated circuits).

Moreover, any one or more of the modules 452, 453, 454, 456, 457 can include their own digital electronic circuitry, computer hardware, firmware, and software as well as dedicated memory, input and output devices, programmable processors, and computer program products. Likewise, any one or more of the modules 452, 453, 454, 456, 457 can access and use the memory 458, the input devices 459$i$, the output devices 459$o$, the programmable processors, and the computer program products.

Although the control system 450 is shown as a separate and complete unit, it is possible for each of its components and modules to be separate units. The control apparatus 451 can include other components, such as dedicated memory, input/output devices, processors, and computer program products, not shown in FIG. 4.

In some implementations, the optical source 372 includes one or more light generators and one or more optical amplifier systems, with an optical amplifier system receiving an output from a light generator to thereby produce the beam of radiation pulses 364.

Figure 5:
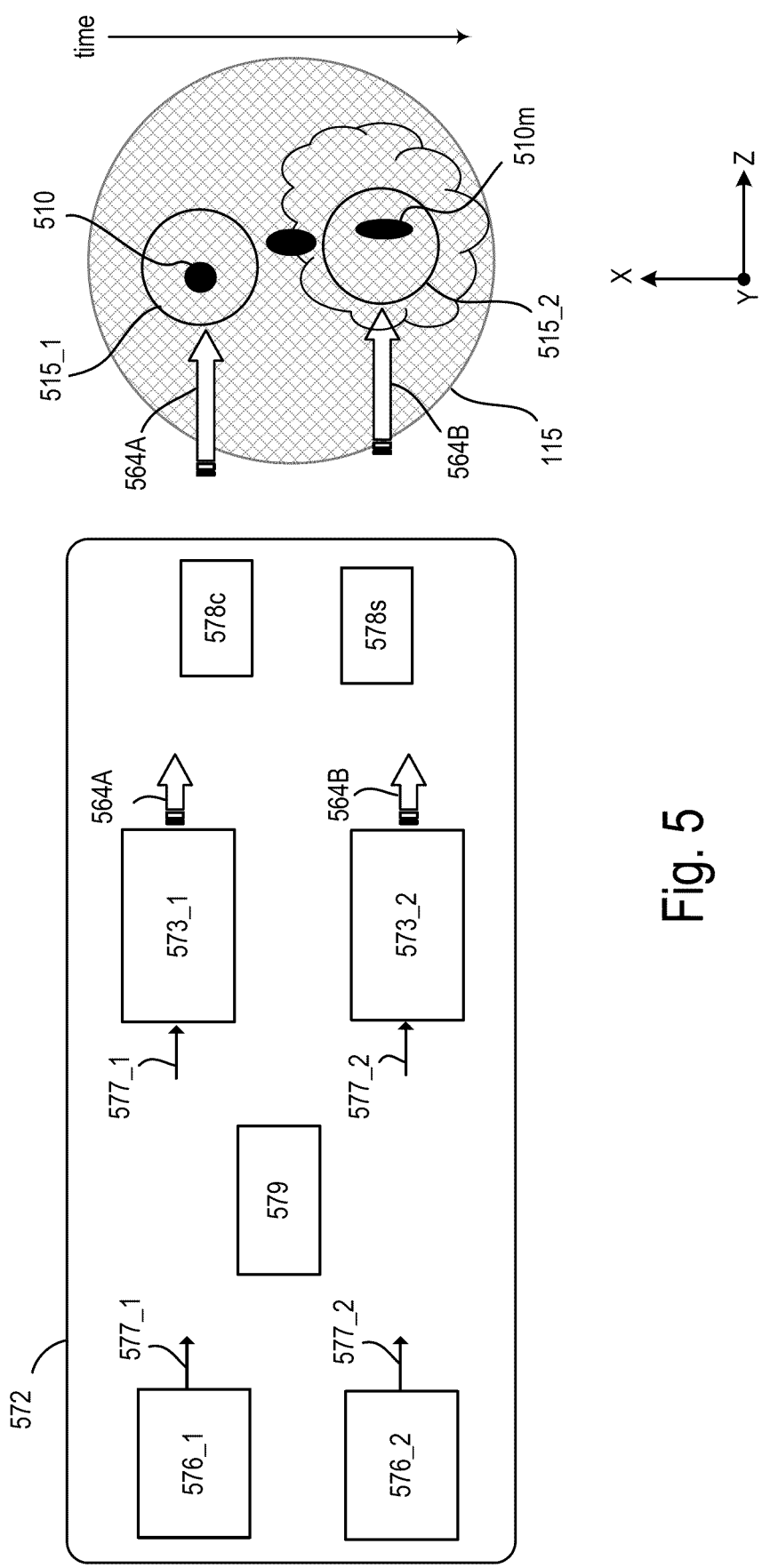
FIG. 5 is a schematic illustration and block diagram of an implementation of an optical source of the EUV light source of FIGS. 3A and 3B and also showing radiation pulses from the optical source interacting with a target in the target space.

In some implementations, such as shown in FIG. 5, the optical source 372 is designed as an optical source 572 that produces a beam of preliminary radiation pulses 564A and a beam of main radiation pulses 564B directed toward respective target locations within the target space 115.

The optical source 572 includes a first optical amplifier system 573_1 that includes a series of one or more optical amplifiers through which the beam of preliminary radiation pulses 564A is passed, and a second optical amplifier system 573_2 that includes a series of one or more optical amplifiers through which the beam of main radiation pulses 564B is passed. One or more amplifiers from the first system 573_1 can be in the second system 573_2; or one or more amplifiers in the second system 573_2 can be in the first system 573_1. Alternatively, it is possible that the first optical amplifier system 573_1 is entirely separate from the second optical amplifier system 573_2.

Additionally, though not required, the optical source 572 can include a first light generator 576_1 that produces a first pulsed light beam 577_1 and a second light generator 576_2 that produces a second pulsed light beam 577_2. The light generators 576_1, 576_2 can each be, for example, a laser, a seed laser such as a master oscillator, or a lamp. An exemplary light generator that can be used as the light generator 576_1, 576_2 is a Q-switched, radio frequency (RF) pumped, axial flow, carbon dioxide ($CO_2$) oscillator that can operate at a repetition rate of, for example, 100 kHz.

The optical amplifiers within the optical amplifier systems 573_1, 573_2 each contain a gain medium on a respective beam path, along which a light beam 577_1, 577_2 from the respective light generator 576_1, 576_2 propagates. When the gain medium of the optical amplifier is excited, the gain medium provides photons to the light beam, amplifying the light beam 577_1, 577_2 to produce the amplified light beam that forms the preliminary radiation pulse beam 564A or the main radiation pulse beam 564B.

The wavelengths of the light beams 577_1, 577_2 or the radiation pulse beams 564A, 564B can be distinct from each other so that the radiation pulse beams 564A, 564B can be separated from each other, if they are combined at any point within the optical source 572. If the radiation pulse beams 564A, 564B are produced by $CO_2$ amplifiers, then the preliminary radiation pulse beam 564A can have a wavelength of 10.26 micrometers (μm) or 10.207 μm, and the main radiation pulse beam 564B can have a wavelength of 10.59 μm. The wavelengths are chosen to more easily enable separation of the beams 564A, 564B using dispersive optics or dichroic mirror or beamsplitter coatings. In the situation in which both beams 564A, 564B propagate together in the same amplifier chain (for example, a situation in which some of the amplifiers of optical amplifier system 573_1 are in the optical amplifier system 573_2), then the distinct wavelengths can be used to adjust a relative gain between the two beams 564A, 564B even though they are traversing through the same amplifiers.

For example, the beams 564A, 564B, once separated, could be steered or focused to two separate locations (such as first and second target locations 515_1, 515_2, respectively) within the target space 115. In particular, the separation of the beams 564A, 564B also enables the target 510 to expand after interacting with the beam of preliminary radiation pulses 564A while it travels from the first target location 515_1 to the second target location 515_2.

The optical source 572 can include a beam path combiner 578$c$ that overlays the beam of preliminary radiation pulses 564A and the beam of main radiation pulses 564B and places the beams 564A, 564B on the same optical path for at least some of the distance between the optical source 572 and the target space 115. Additionally, the optical source 572 can include a beam path separator 578$s$ that separates the beam of preliminary radiation pulses 564A from the beam of main radiation pulses 564B so that the two beams 564A, 564B can be separately steered and focused within the target space 115.

Additionally, the beam of preliminary radiation pulses 564A can be configured to have less pulse energy than the pulse energy of the beam of main radiation pulses 564B. This is because the preliminary radiation pulse 564A is used to modify the geometry of the target 510 while the main radiation pulse 564B is used to convert the modified target into plasma 144. For example, the energy of the preliminary radiation pulse 564A can be 5-100 times less than the energy of the main radiation pulse 564B.

In some implementations, each optical amplifier system 573_1, 573_2 includes a set of three optical amplifiers, though as few as one amplifier or more than three amplifiers can be used. In some implementations, each of the optical amplifiers in each system 573_1, 573_2 includes a gain medium that includes $CO_2$ and can amplify light at a wavelength of between about 9.1 µm and about 11.0 µm, and in particular, at about 10.6 µm, at a gain greater than 1000. It is possible for the optical amplifiers in each system 573_1, 573_2 to be operated similarly or at different wavelengths. Suitable amplifiers and lasers for use in the optical amplifier systems 573_1, 573_2 can include a pulsed laser device such as a pulsed gas-discharge $CO_2$ amplifier producing radiation at about 9.3 µm or about 10.6 µm, for example, with DC or RF excitation, operating at relatively high power, for example, 10 kW or higher and high pulse repetition rate, for example, 50 kHz or more. Exemplary optical amplifiers that can be used in each of the systems 573_1, 573_2 are axial flow high-power $CO_2$ lasers with wear-free gas circulation and capacitive RF excitation.

Additionally, though not required, one or more of the optical amplifier systems 573_1, 573_2 can include a first amplifier that acts as a pre-amplifier. The pre-amplifier, if present, can be a diffusion-cooled $CO_2$ laser system.

The optical amplifier systems 573_1, 573_2 can include optical elements for directing and shaping the respective light beams 577_1, 577_2. For example, the optical amplifier systems 573_1, 573_2 can include reflective optics such as mirrors, partially-transmissive optics such as beam splitters or partially-transmissive mirrors, and dichroic beam splitters.

The optical source 572 also includes an optical system 579 that can include one or more optics (such as reflective optics such as mirrors, partially reflective and partially transmissive optics such as beamsplitters, refractive optics such as prisms or lenses, passive optics, active optics, etc.) for directing the light beams 577_1, 577_2 through the optical source 572.

Although the optical amplifiers can be separate and dedicated systems, it is possible for at least one of the amplifiers of the optical amplifier system 573_1 to be in the optical amplifier system 573_2 and for at least one of the amplifiers of the optical amplifier system 573_2 to be in the optical amplifier system 573_1. In such a system in which at least some of the amplifiers and optics overlap between the optical amplifier systems 573_1, 573_2, it is possible that the beam of preliminary radiation pulses 564A and the beam of main radiation pulses 564B are coupled together such that changes of one or more characteristics of the pulses 564A can cause changes to one or more characteristics of the pulses 564B, and vice versa.

As shown, an example of a target 510 interacts with two radiation pulses 564A, 564B within the target space 115. The radiation pulses 564A, 564B can be directed generally along the Z direction. The interaction between the preliminary radiation pulse 564A and the target 510 at the first target location 515_1 causes the target 510 to modify its shape so as to deform and to geometrically expand as it moves through the target space 115 and become a modified target 510m as it reaches the second target location 515_2. The interaction between the main radiation pulse 564B and the modified target 510m at the second target location 515_2 converts at least part of the modified target 510m into plasma 144 that emits EUV light 361. It is possible for some of the material of the target 510 to be converted into plasma when it interacts with the preliminary radiation pulse 564A. However, the properties of the preliminary radiation pulse 564A are selected and controlled so that the predominant action on the target 510 by the preliminary radiation pulse 564A is the deformation and modification of the geometric distribution of the target 510.

The interaction between the preliminary radiation pulse 510 and the target 510 causes material to ablate from the surface of the target 510 and this ablation provides a force that deforms the target 510 so that it has a shape that is different than the shape of the target 510 prior to interaction with the preliminary radiation pulse 564A. For example, prior to interacting with the preliminary radiation pulse 564A, the target 510 can have a shape that is similar to a droplet upon exiting the target delivery system 155, while after interaction with the preliminary radiation pulse 564A, the shape of the target 510 deforms so that the shape of the modified target 510m is closer to the shape of a disk (such as a pancake shape) when it reaches the second target location 515_2. After interaction with the preliminary radiation pulse 564A, the target 510 can be a material that is not ionized (a material that is not a plasma) or that is minimally ionized. After interaction with the preliminary radiation pulse 564A, the target 510m can be, for example, a disk of liquid or molten metal, a continuous segment of target material that does not have voids or substantial gaps, a mist of microparticles or nanoparticles, or a cloud of atomic vapor.

Additionally, the interaction between the preliminary radiation pulse 564A and the target 510 that causes the material to ablate from the surface of the target 510 can provide a force that can cause the target 510 to acquire some propulsion or speed along the Z direction, as shown in FIG. 5. The expansion of the modified target 510m as it travels from the first target location 515_1 to the second target location 515_2 in the X direction and the acquired speed in the Z direction depend on an energy of the preliminary radiation pulse 564A, and in particular, on the energy delivered to (that is, intercepted by) the target 510.

As discussed above, the EUV light source 360 adjusts one or more characteristics of the radiation pulse 364 that is directed to the target space 115 based on the analysis of the determined moving property or properties of the current target 110c. Accordingly, it is possible for the EUV light source 360 to adjust one or more characteristics of the preliminary radiation pulse 564A, one or more characteristics of the main radiation pulse 564B, or one or more characteristics of both of the preliminary radiation pulse 564A and the main radiation pulse 564B.

Figure 6A:
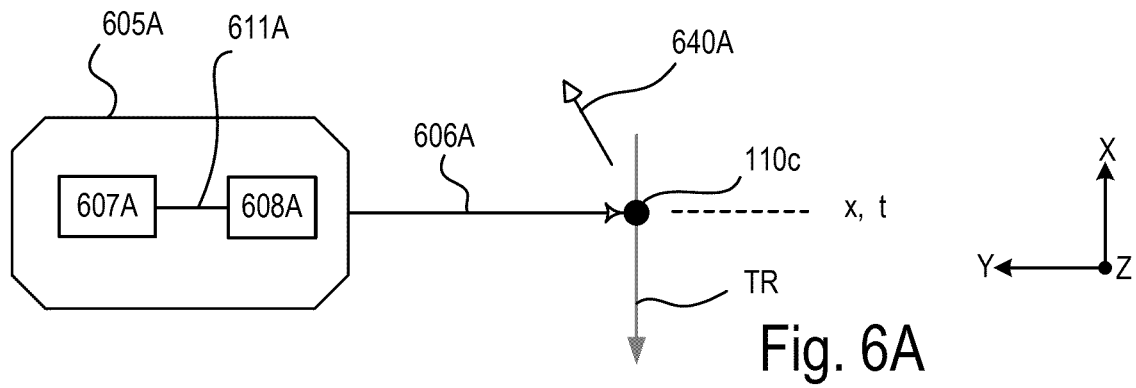
FIG. 6A is a schematic illustration and block diagram of an implementation of a diagnostic system producing a single diagnostic light beam.

Referring to FIG. 6A, in some implementations, the diagnostic system 105 is designed as a diagnostic system 605A. The diagnostic system 605A produces, as the one or more diagnostic probes 106, a single diagnostic light beam 606A from a light source 607A. The diagnostic light beam 606A is directed as a light curtain to cross the trajectory TR at a position x so that each of the targets 110 pass through the light curtain on their way to the target space 115. The light source 607A produces a single light beam 611A, which is directed through one or more optical elements 608A (such as mirrors, lenses, apertures, and/or filters) that modify the light beam 611A to form the single diagnostic light beam 606A.

The light source 607A can be a solid-state laser such as a YAG laser, which can be a neodymium-doped YAG (Nd: YAG) laser operating at 1070 nm and at 50 W power. In this example, when the current target 110c passes through the diagnostic light beam 606A at time t, at least some of the diagnostic light beam 606A is reflected or scattered from the current target 110c to form the light 640A, which is detected by the metrology apparatus 100 (by way of the first detection apparatus 120). The metrology apparatus 100 uses this information (in combination with the information from the second detection apparatus 130) to estimate the arrival time of the present target 110' at the target space 115 and therefore to adjust characteristics of the radiation pulse 364 to ensure that the radiation pulse 364 interacts with the present target 110' in the target space 115. The metrology apparatus 100 can also rely on some assumptions about the path of the present target 110' to perform the calculations to estimate the arrival time of the present target 110' at the target space 115. For example, the metrology apparatus 100 could assume a particular velocity of the present target 110' at a particular point along the trajectory TR.

The diagnostic light beam 606A can be a Gaussian beam so that its transverse profile of the optical intensity can be described with a Gaussian function. The focus or beam waist of the diagnostic light beam 606A can be configured to overlap at the trajectory TR or the −X direction. Moreover, optical elements 608A can include refractive optics that ensure that the focus (or beam waist) of the diagnostic light beam 606A overlaps the trajectory TR.

Figure 6B:
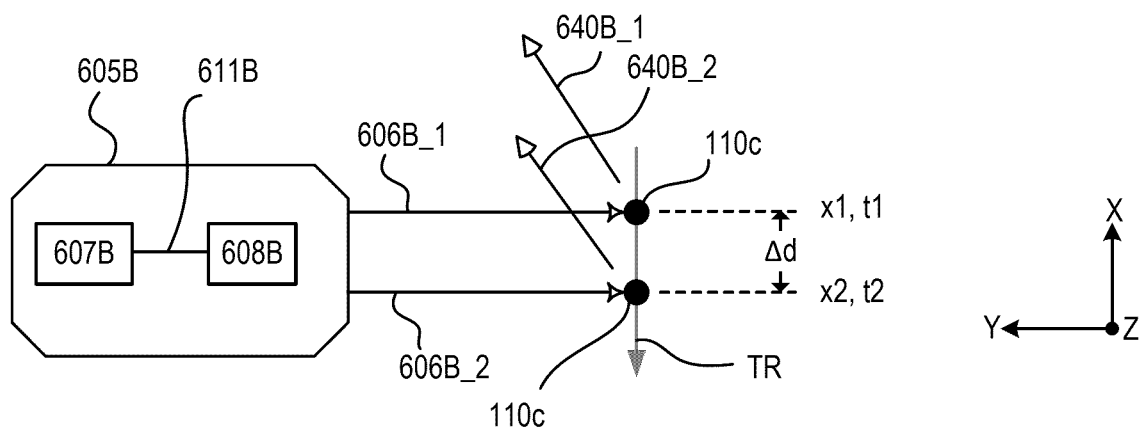
FIG. 6B is a schematic illustration and block diagram of an implementation of a diagnostic system producing two diagnostic light beams from a single light source.

Referring to FIG. 6B, in some implementations, the diagnostic system 105 is designed as a diagnostic system 605B. The diagnostic system 605B produces, as the one or more diagnostic probes 106, two diagnostic light beams 606B_1 and 606B_2. The diagnostic light beam 606B_1 is directed as a first light curtain to cross the trajectory TR at a first location (for example, the location x1 along the X axis) so that each of the targets 110 pass through the first light curtain on their way to the target space 115. The diagnostic light beam 606B_2 is directed as a second light curtain to cross the trajectory TR at a second location (for example, the location x2 along the X axis) so that each of the targets 110 pass through the second light curtain on their way to the target space 115 and after having already passed through the first light curtain. The diagnostic light beams 606B_1, 606B_2 are separated by a distance Δx that is equal to x2−x1 at the trajectory TR. This dual-curtain diagnostic system 605B can be used to determine not only location and arrival information of the target 110 but also can be used to determine the speed or velocity of the target 110.

In some implementations, the diagnostic system 605B includes a single light source 607B that produces a single light beam 611B and one or more optical elements 608B that receive the single light beam and split the light beam 611B into the two diagnostic light beams 606B_1, 606B_2. Additionally, the optical components 608B can include components for directing the diagnostic light beams 606B_1, 606B_2 toward the respective locations x1, x2 along the trajectory TR.

In some implementations, the optical components 608B include a beam splitter that splits the single light beam from the single light source 607B into the two diagnostic light beams 606B_1, 606B_2. For example, the beam splitter can be a dielectric mirror, a beam splitter cube, or a polarizing beam splitter. One or more of the optical components 608B can be reflective optics placed to redirect either or both of the diagnostic light beams 606B_1, 606B_2 so that both diagnostic light beams 606B_1, 606B_2 are directed toward the trajectory TR.

In other implementations, the optical components 608B include a splitting optic (such as a diffractive optic or a binary phase diffraction grating, a birefringent crystal, an intensity beam splitter, a polarization beam splitter, or a dichroic beam splitter) and a refractive optic such as a focusing lens. The light beam 611B is directed through the splitting optic, which splits the light beam 611B into two light beams, which travel along distinct directions and are directed through the refractive optic to produce the diagnostic light beams 606B_1, 606B_2. The splitting optic can split the light beam 611B so that the diagnostic light beams 606B_1, 606B_2 are separated by a set distance (for example, 0.65 mm along the X direction) at the trajectory TR. In this example, x2−x1=0.65 mm. Moreover, the refractive optic can ensure that the foci (or beam waist) of each of the diagnostic light beams 606B_1, 606B_2 overlaps the trajectory TR.

As shown in this example, the diagnostic light beams 606B_1, 606B_2 are directed so that they intersect the trajectory TR at different locations x1, x2, but generally intersect at substantially similar angles relative to the X axis. For example, the diagnostic light beams 606B_1, 606B_2 are directed at about 90° relative to the X axis. In other implementations, it is possible to use the splitting optic and the refractive optic to adjust the angle at which the diagnostic light beams 606B_1, 606B_2 are directed relative to the X axis so that they fan out toward the trajectory TR and intersect the trajectory TR at different and distinct angles. For example, the diagnostic light beam 606B_1 can intersect the trajectory TR at approximately 90° relative to the −X direction while the diagnostic light beam 606B_2 can intersect the trajectory TR at an angle that is less than 90° relative to the −X direction.

Each of the diagnostic light beams 606B_1, 606B_2 can be a Gaussian beam so that the transverse profile of the optical intensity of each diagnostic light beam 606B_1, 606B_2 can be described with a Gaussian function. The focus or beam waist of each diagnostic light beam 606B_1, 606B_2 can be configured to overlap at the trajectory TR or the −X direction.

The light source 607B can be a solid-state laser such as a YAG laser, which can be a neodymium-doped YAG (Nd: YAG) laser operating at 1070 nm and at 50 W power. In this example, the current target 110c passes through the first diagnostic light beam 606B_1 at time t1 (and location x1), and at least some of the diagnostic light beam 606B_1 is reflected or scattered from the current target 110c to form light 640B_1 (as the light 140), which is detected by the metrology apparatus 100 (by way of the first detection apparatus 120). Additionally, the current target 110c passes through the second diagnostic light beam 606B_2 at time t2 (and location x2), at least some of the diagnostic light beam 606B_2 is reflected or scattered from the current target 110c to form the light 640B_2 (as the light 140), which is detected by the metrology apparatus 100 (by way of the first detection apparatus 120).

The separation Δd between the diagnostic light beams 606B_1, 606B_2 at the trajectory TR can be adjusted or customized depending on the rate at which the targets 110 are released from the target delivery system 155 as well as the size and material of the targets 110. For example, separation Δd can be less than the spacing between adjacent targets 110. As another example, the separation Δd can be determined or set based on the spacing between adjacent targets 110 to provide for greater precision in the measurements that are performed based on the interactions between the diagnostic light beams 606B_1, 606B_2 and the current target 110c. Up to a point and in general, the larger the separation Δd the higher the precision in the measurements that are performed. For example, the separation Δd can be between about 250 μm and 800 μm.

The interactions between the diagnostic light beams 606B_1, 606B_2 and the current target 110c enable the control system 150 to determine a moving property such as a velocity V of the current target 110c along the −X direction. It is also possible to determine trends in the velocity V or the changing velocity V over many targets. It is also possible to determine a change in a moving property of the current target 110c along the −X direction using only the diagnostic light beams 606B_1, 606B_2 if some assumptions about the motion of the current target 110c are made.

The wavelength of the diagnostic probe 106 (such as the diagnostic light beam 206, the diagnostic light beam 606A, and the diagnostic light beams 606B_1, 606B_2) produced by the diagnostic system should be distinct enough from the wavelength of the radiation pulses 364 produced by the optical source 372 so that the blocking device 234 can block the light 140 reflected from the current target 110c and also any stray light from the radiation pulses 364 while enabling the broadband optical radiation 142 to pass. In some implementations, the wavelength of the diagnostic light beam 206, 606A, 606B_1, 606B_2 is 532 nm or 1550 nm.

Figure 7:
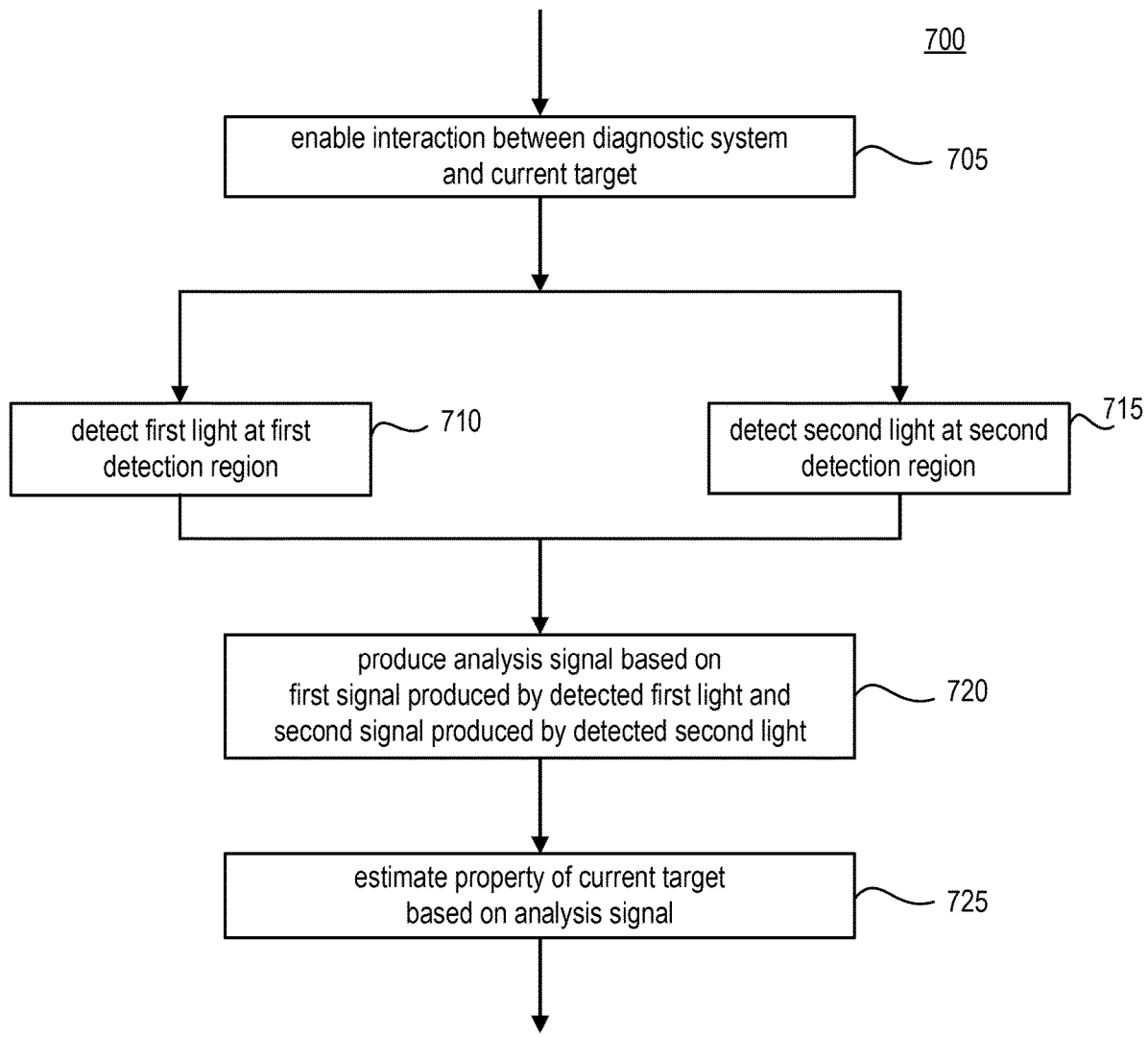
FIG. 7 is a flow chart of a procedure performed by the metrology apparatus of FIGS. 1A, 2, 3A, or 3B.

Referring to FIG. 7, a procedure 700 is performed by the metrology apparatus 100 (or 200) for estimating one or more properties of the current target 110c. Initially, the metrology apparatus 100 enables an interaction between the diagnostic system 105 and the current target 110c (705). This interaction can be between a diagnostic probe or probes such as, for example, the probe 106, the probe 206, the diagnostic light beam 606A, or the diagnostic light beams 606B_1, 606B_2 and the current target 110c as the current target 110c crosses the path of the diagnostic probe 106. For example, the control system 150 can be configured to send a signal to the diagnostic system 105 to produce the diagnostic probe 106 that crosses the X axis and therefore is in the path of the current target 110c as it is released toward the target space 115.

The metrology apparatus 100 detects first light at a first detection region (710). The first light includes the broadband optical radiation (the light 142) emitted from the plasma 144 produced by the previous target 110p. The first light includes the light 140 produced from the interaction between the current target 110c and the diagnostic system 105. For example, the first detection apparatus 220 can detect the first light. In this example, the first light is detected at the first light detector 222, which can be considered as the first detection region. A first signal (such as signal 223) is produced from the detected first light and this first signal 223 is directed to the control system 150, 250. The light 140 produced from the interaction between the current target 110c and the diagnostic system 105 can include light from the diagnostic probe 106 that is reflected from the current target 110c.

Figure 8:
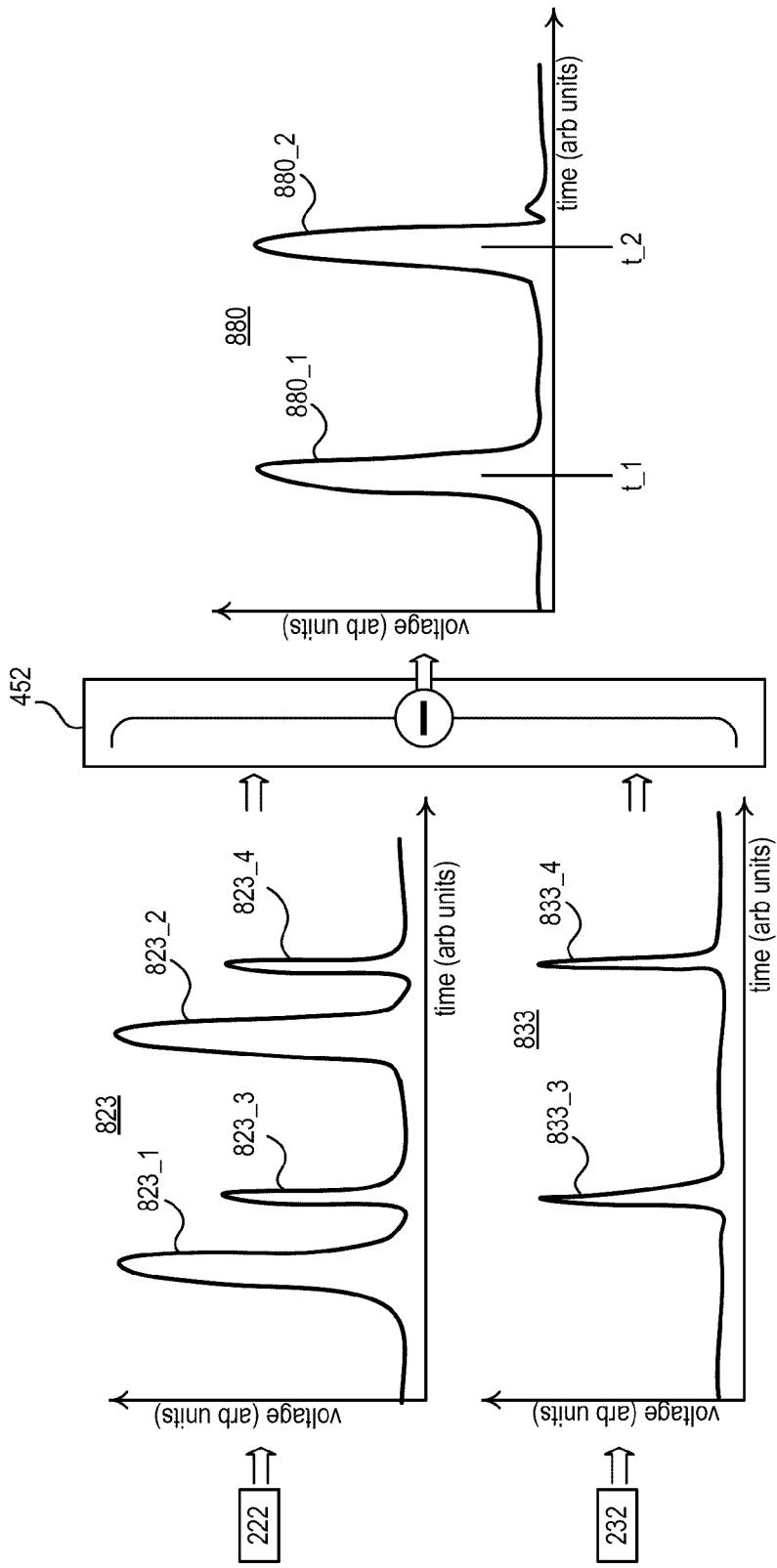
FIG. 8 is a schematic illustration of an example of the output signals from respective first and second detection apparatuses of the metrology apparatus of FIGS. 1A, 2, 3A, or 3B, showing signal processing performed by the control system and an analysis signal produced by the signal processing.

Referring to FIG. 8, an example of a first signal 823 shown. The first signal 823 is a voltage signal that is related to current produced from the detected light at the first light detector 222 versus time. In this example, the first light detector 222 is set up with a blocking device 224 that transmits light having a center wavelength that corresponds to the center wavelength of the light 140 and the blocking device 224 has a transmission bandwidth of about 10-20 nm. The first signal 823 display a peak 823_1 in intensity associated with the light 140 produced from the interaction between the current target 110c and the diagnostic system 105 as well as a peak 823_2 in intensity associated with the light 140 produced from the interaction between a target 110 adjacent to the current target 110c and the diagnostic system 105. The first signal 823 also displays peaks 823_3, 823_4 in intensity associated with the light 142. As evident from this example, the intensity or amplitude of the peaks 823_3, 823_4 due to the broadband optical radiation 142 is on the order of the intensity or amplitude of the peaks 823_1, 823_2 due to the diagnostic light 140.

In general, the shape of the signal 223 that is output from the first light detector 222 can fluctuate and change depending on various parameters in the first light detector 222 and the blocking device 224. The signal 823 shown in FIG. 8 merely provides one example of what the signal 223 could look like. Other shapes for the signal 223 are possible.

Referring again to FIG. 7, the metrology apparatus 100 detects second light at a second detection region (715). The second light includes the broadband optical radiation (the light 142) emitted from the plasma 144 produced by the previous target 110p. Most of the light 140 is prevented from reaching the second detection region. For example, the second detection apparatus 230 can detect the second light. In this example, the second light is detected at the second light detector 232, which can be considered as the second detection region. A second signal (such as signal 233) is produced from the detected second light and this second signal 233 is directed to the control system 150, 250. The diagnostic light 140 can be blocked with the blocking device 234 based on one or more of a spectral property, a polarization property, and a spatial property of the diagnostic light 140, as discussed in more detail below.

Referring to FIG. 8, an example of a second signal 833 shown. The second signal 833 is a voltage signal that is related to current produced from the detected light at the second light detector 232 versus time. In this example, the second light detector 232 is set up with a blocking device 234 that transmits light having a center wavelength that is shifted by 50 nm from the center wavelength of the light 140 and the blocking device 234 has a transmission bandwidth of about 10-20 nm. The second signal 833 displays only peaks 823_3, 823_4 in intensity associated with the light 142 because the blocking device 234 has blocked much of the diagnostic light 140. It is not necessary that the blocking device 234 blocks 100% of the light 140; rather, the blocking device 234 need only block enough of the light 140 to obtain a clear representation of the peaks associated with the light 142 such that the second signal 833 can be used to remove the signal due to the light 142 from the first signal 823 in the following steps.

In some implementations, the metrology apparatus 100 detects the first light (710) and the second light (715) during or after a preceding (for example, immediately preceding) target 110 has interacted with a prior radiation pulse 364. Generally, the metrology apparatus 100 detects the first light (710) and the second light (715) in parallel with each other. That is, the signals 223, 233 (referred to as S1($t$) and S2($t$), respectively, below) from the respective first and second detection apparatuses 220, 230 are both sent to the control system 250 continuously, and are acquired at the same time t.

The metrology apparatus 100 produces an analysis signal based on the first signal produced from the detected first light and the second signal produced from the detected second light (720). For example, with reference to FIG. 8 and also to FIG. 4, the signal processing module 452 receives the first signal 823 and the second signal 833 from, respectively, first light detector 222 and second light detector 232. The signal processing module 452 electronically subtracts the second signal 833 from the first signal 823 to obtain an analysis signal 880. The signal processing module 452 can perform the electronic subtraction by digitizing each of the first signal 823 and the second signal 833, and then compute the difference between each set of sample points (in the respective digitized signals). In other implementations, the signal processing module 452 performs the electronic subtraction using analog electronics.

The signal processing module 452 can perform the subtraction based on an assumption relating to the second signal produced from the detected second light.

Specifically, it can be assumed that a multiplicative gain factor can be estimated and accessed by the signal processing module 452. For example, the multiplicative gain factor can be estimated as an input parameter and stored in memory 458 for access by the signal processing module 452. As another example, the multiplicative gain factor can be estimated in a dynamic fashion through an on-line measurement that appropriately scales the second signal produced from the detected second light so that when the subtraction is performed, the portion of the signal from the light 142 is effectively canceled or substantially reduced. The multiplicative gain factor is discussed in greater detail below.

The signal that is sampled by the second detector 232 is in a different spectral band (or wavelength range) and is also in a different spatial location from the signal that is sampled by the first detector 222. Nevertheless, it can be assumed that the signal sampled by the second detector 232 has the same time dependence as the signal sampled by the first detector 222.

The analysis signal 880 contains a representation of the diagnostic light 140 without requiring time gating to isolate the diagnostic light 140 from the broadband optical radiation 142. The analysis signal 880 includes the peaks 880_1, 880_2 that correspond, respectively, to the peaks 823_1, 823_2 of the first signal 823.

A property or properties of the current target 110c is estimated based on this analysis signal (725). For example, the signal processing module 452 can process or analyze the analysis signal 880 to estimate an arrival time of the current target 110c (or a present target 110') at a particular position in space such as a region within the target space 115, to estimate a speed, velocity, or acceleration of the current target 110c, or to estimate a time interval between an arrival of the current target 110c at a particular position in space and an arrival of another target at that particular position in space.

The shape of the analysis signal 880 correlates with the amount or intensity of the light 140 impinging on the first light detector 222. For example, the signal processing module 452 can convert the analysis signal 880 into a set of values that correspond to maximum intensities of the detected light. The value of each maximum intensity can be digitally time stamped and then used to determine the one or more moving properties of the current target 110c.

For example, the signal processing module 452 can include a time module that receives the analysis signal 880 and digitally time stamps each individual voltage peak 880_1, 880_2. The voltage peak 880_1 corresponds to the time when the current target 110c interacts with the diagnostic probe 106 and the voltage peak 880_2 corresponds to the time when the adjacent target interacts with the diagnostic probe 106. For example, the time stamps t_1 and t_2 are shown in FIG. 8.

The location of the time stamps t_1 and t_2 can be selected by the signal processing module 452 to generally correspond to a center location of respective peak 880_1, 880_2. For example, in some implementations, the signal processing module 452 can be configured to low-pass filter the transient peak signal 823 coming from the first light detector 222 (which can be a photodiode), the signal processing module 452 can determine a time derivative of that filtered signal, and use a zero-crossing of the derivative to estimate where the center of the peak 880_1 is and select that location as t_1. In other implementations, the signal processing module 452 could select the location of the midpoint of the half-maximum crossings as the location for t_1. The shape of the transient peak signal 823_1 can be different depending on the shape of the current target 110c (for example, the targets 110 can undergo shape oscillations as they travel along their trajectory) and thus, the signal processing module 452 can be sensitive to the centroid but not the shape of the transient peak signal 823 in some implementations.

These time stamps can then be used to determine the moving properties of the current target 110c. The signal processing module 452 can also access other data relating to the current target 110c or to the diagnostic system 105 that are stored in memory 458. For example, the memory 458 can store information relating to a prior velocity associated with the current target 110c. The memory 458 can store information relating to a spacing Δd between the diagnostic light beams 606B_1, 606B_2 if the diagnostic system is designed as the dual-beam diagnostic system 605B of FIG. 6B or can store the location at which the diagnostic probe 108 interacts with each target.

The signal processing module 452 can determine the speed or velocity of the current target 110c using the time stamps output from the dual-beam diagnostic system 605B of FIG. 6B.

The signal processing module 452 can determine the predicted time that the present target 110' (which can be the current target 110c) will be at a location within the target space 115. The signal processing module 452 is able to determine the predicted time of arrival of the present target 110' at the target location by using the estimated velocity and other information stored in memory 458. Specifically, the memory 458 can store the distance between the crossing of the diagnostic light beam 606B_2 with the trajectory TR of the current target 110c and the target location in the target space 115 along the X direction. The signal processing module 452 can determine the time that the current target 110c passes through the path of the diagnostic light beam 606B_2. Thus, it is possible for the signal processing module 452 to estimate or determine the arrival of the current target 110c at the target location in the target space 115 as being the stored distance divided by the estimated velocity.

The output or outputs from the signal processing module 452 can be considered a control signal and is directed to the optical source actuation module 454, which interfaces with the optical source 372. The control signal from the signal processing module 452 provides instructions that cause the actuation module 454 to adjust aspects of the optical source 372 to thereby adjust one or more of a timing of a release of one or more radiation pulses 364 and a direction at which the radiation pulse 364 travels.

In some implementations, the signal processing module 452 can perform additional processing to discriminate between the diagnostic light 140 and the broadband optical radiation 142 in the first signal 823 if the blocking devices 224, 234 fail to adequately and physically discriminate between the diagnostic light 140 and the broadband optical radiation 142. One reason that this additional processing works is that there is a difference in discrimination between the two signals 223, 233 on the first and second light detectors 222, 232, respectively. That is, one of the detectors (such as the first light detector 222) senses or detects more of the broadband optical radiation 142 than the other detector (the second light detector 232). Additionally, the time dependence of the signals 223, 233 are the same. As an example, if the signal 223 is represented as $S1(t)$ and the signal 233 is represented as $S2(t)$, the signals generally have the same time dependence $f(t)$ if $S1(t)=a*f(t)+b$ and $S2(t)=c*f(t)+d$, where a, b, c, d are constants. That is, all of the time-derivatives of S1 and S2 that exist (dS1/dt, dS2/dt, etc.) are the same up to a constant multiplicative factor.

Specifically, the signals $S1(t)$ and $S2(t)$ can be represented in terms of the signals related to the diagnostic light 140 and the broadband optical radiation 142, as follows. If the signal from the diagnostic light 140 is represented as $d(t)$ and the broadband optical radiation 142 is represented as $p(t+t')$, where t is time and t' is a delay between the production of the diagnostic light 140 and the broadband optical radiation 142. The signal $S1(t)$ detected at the first light detector 222 is a linear superposition of these two signals according to the sensitivity of the first light detector 222 as follows: $S1(t)=e*d(t)+f*p(t+t')$, where e and f are fixed constants determined by the blocking device 224, the first light detector 222, and the spectrum of the diagnostic light 140 and the broadband optical radiation 142. The signal $S2(t)$ detected at the second light detector 232 is a linear superposition of these two signals according to the sensitivity of the second light detector 232 as follows: $S2(t)=g*d(t)+h*p(t+t')$, where g and h are fixed constants determined by the blocking device 234, the second light detector 232, and the spectrum of the diagnostic light 140 and the broadband optical radiation 142.

The diagnostic light 140 d(t) can be solved by solving the linear equations:

$$d(t)=[S1(t)-S2(t)-(f-h)*p(t+t')]/(e-g).$$

The signals S1 and S2 are the raw signals 223, 233 at the output of the respective light detectors 222, 232. Given the freedom to choose a user-variable multiplicative gain factor "a" for at least one of the signals (such as S1), then:

$$d(t)=[S1(t)-a*S2(t)-(f-a*h)*p(t+t')]/(e-a*g).$$

If a user chooses a=f/h, then:

$$d(t)=[S1(t)-(f/h)*S2(t)]/(e-f*g/h),$$

which is not sensitive to the signal $p(t+t')$ from the broadband optical radiation 142.

Figure 6C:
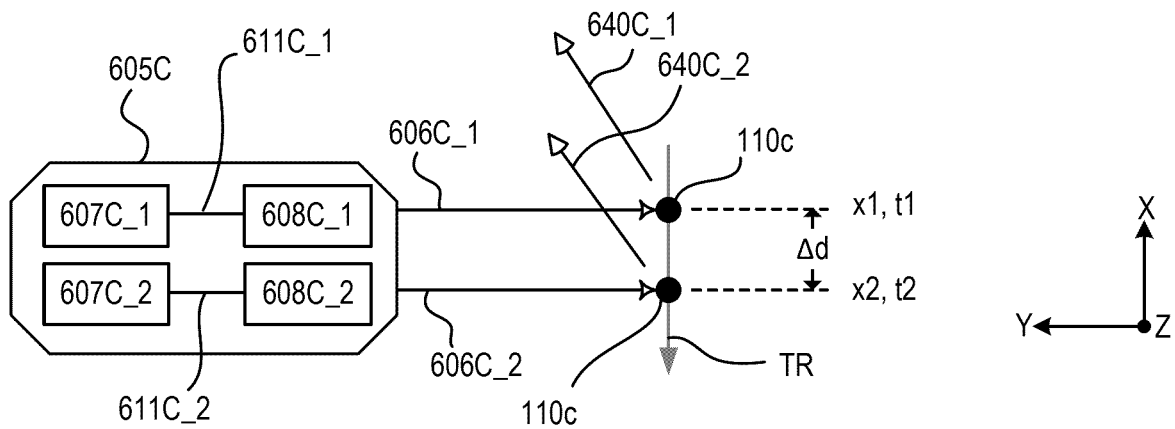
FIG. 6C is a schematic illustration and block diagram of an implementation of a diagnostic system producing two diagnostic light beams from respective light sources.

In other implementations such as shown in FIG. 6C, instead of having a single light source such as light source 607B in the diagnostic system 605B, a diagnostic system 605C includes a pair of light sources 607C_1, 607C_2 (such as two lasers), each producing a light beam 611C_1, 611C_2, respectively. Each of the light beams 611C_1, 611C_2 pass through a respective one or more optical elements 608C_1, 608C_2, which can alter or adjust characteristics of the light beams 611C_1, 611C_2. The output of each of the one or more optical elements is a respective diagnostic light beam 606C_1, 606C_2. The optical components 608C_1, 608C_2 can include components for directing the respective diagnostic light beams 606C_1, 606C_2 toward the respective locations x1, x2 along the trajectory TR. Examples of the optical components 608C_1, 608C_1 are discussed above with reference to optical components 608B.

Each of the diagnostic light beams 606C_1, 606C_2 can be a Gaussian beam so that the transverse profile of the optical intensity of each diagnostic light beam 606C_1, 606C_2 can be described with a Gaussian function. The focus or beam waist of each diagnostic light beam 606C_1, 606C_2 can be configured to overlap at the trajectory TR or the −X direction.

Each light source 607C_1, 607C_2 can be a solid-state laser. In one example, the solid-state laser is a YAG laser such as a neodymium-doped YAG (Nd:YAG) laser operating in a range of 1010 nm-1070 nm and at a power in the range of tends of watts. In another example, the solid-state laser is a ytterbium-doped fiber laser operating in a range of 1010 nm-1070 nm, for example, at 1020 nm or at 1070 nm, depending on other considerations. In this example, similar to the design of FIG. 6B, the current target 110c passes through the first diagnostic light beam 606C_1 at time t1 (and location x1), and at least some of the diagnostic light beam 606C_1 is reflected or scattered from the current target 110c to form light 640C_1 (as the light 140), which is detected by the metrology apparatus 100 (by way of the first detection apparatus 120). Additionally, the current target 110c passes through the second diagnostic light beam 606C_2 at time t2 (and location x2), at least some of the diagnostic light beam 606C_2 is reflected or scattered from the current target 110c to form the light 640C_2 (as the light 140), which is detected by the metrology apparatus 100 (by way of the first detection apparatus 120).

The separation Δd between the diagnostic light beams 606C_1, 606C_2 at the trajectory TR can be adjusted or customized depending on the rate at which the targets 110 are released from the target delivery system 155 as well as the size and material of the targets 110. For example, separation Δd can be less than the spacing between adjacent targets 110. As another example, the separation Δd can be determined or set based on the spacing between adjacent targets 110 to provide for greater precision in the measurements that are performed based on the interactions between the diagnostic light beams 606C_1, 606C_2 and the current target 110c. Up to a point and in general, the larger the separation Δd the higher the precision in the measurements that are performed. For example, the separation Δd can be between about 250 μm and 800 μm.

The interactions between the diagnostic light beams 606C_1, 606C_2 and the current target 110c enable the control system 150 to determine a moving property such as a velocity V of the current target 110c along the −X direction. It is also possible to determine trends in the velocity V or the changing velocity V over many targets. It is also possible to determine a change in a moving property of the current target 110c along the −X direction using only the diagnostic light beams 606C_1, 606C_2 if some assumptions about the motion of the current target 110c are made.

The wavelength of the diagnostic light beams 606C_1, 606C_2 produced by the diagnostic system 605C should be distinct enough from the wavelength of the radiation pulses 364 produced by the optical source 372 so that the blocking device 234 can block the light 640C_1, 640_C2 reflected from the current target 110c and also any stray light from the radiation pulses 364 while enabling the broadband optical radiation 142 to pass. In some implementations, the wavelength of the diagnostic light beam 606C_1, 606C_2 is 532 nm or 1550 nm.

Figure 9:
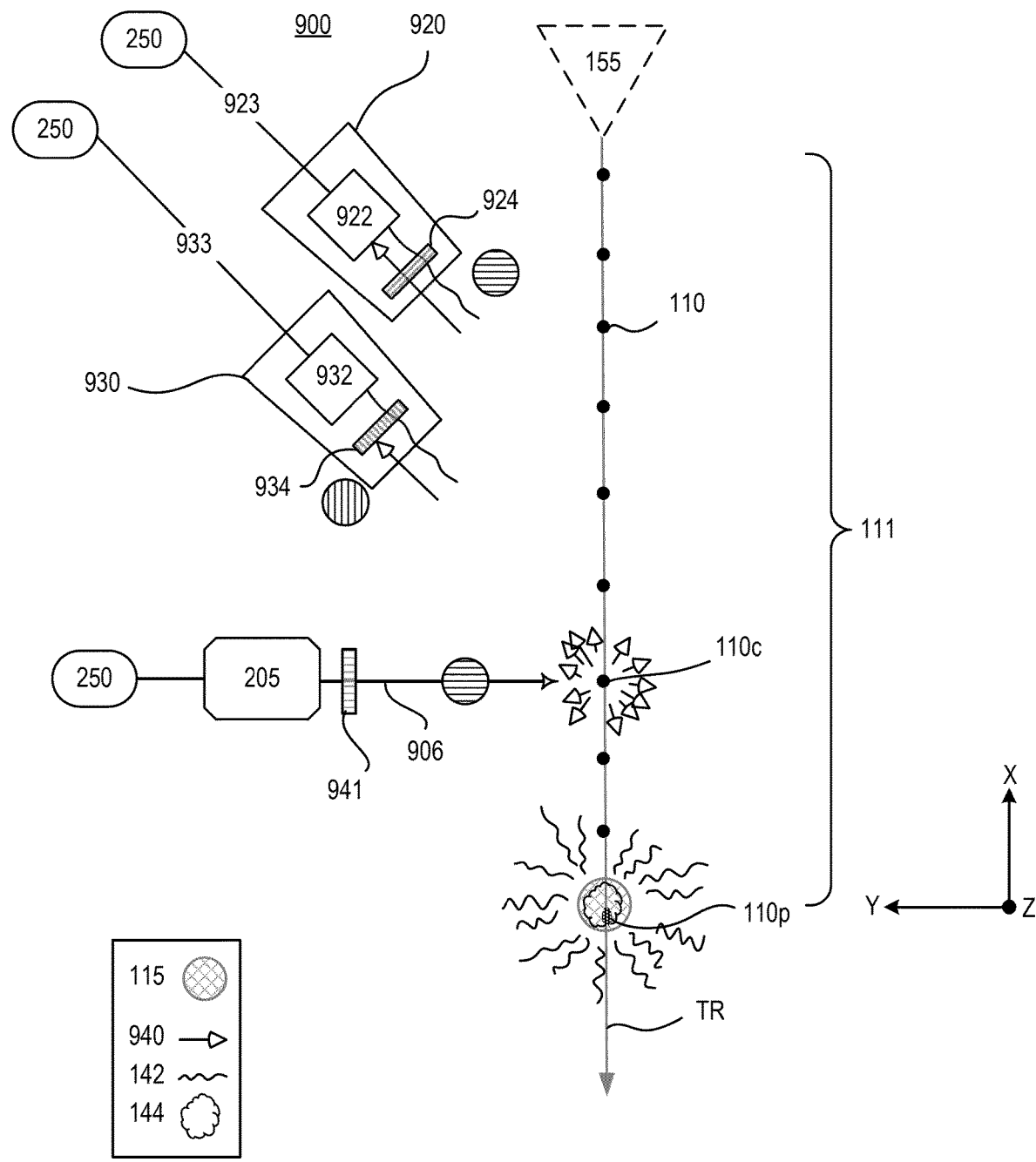
FIG. 9 is a schematic illustration and block diagram of another implementation of the metrology apparatus of FIG. 1A.

Referring also to FIG. 9, in another implementation, the blocking devices 224 and 234 implemented in the metrology apparatus 200 shown in FIG. 2 can be designed as polarization filters 924, 934 instead of as spectral filters. In this way, in metrology apparatus 900, polarization is used to discriminate between the light that is blocked and the light that is permitted to pass through to the light detectors. In this implementation, the diagnostic light 940 that is produced from the interaction between the diagnostic light beam 906 and the current target 110c is polarized. This diagnostic light 940 can be polarized because the diagnostic light beam 906 has a particular polarization. Or, it is possible to pass the diagnostic light beam 906 through a polarizer 941 to purify the polarization state of the diagnostic light beam 906. By contrast, the broadband optical radiation 142 is unpolarized by its nature. In this example, the blocking device 924 is a polarization filter oriented parallel with the polarization of the diagnostic light 940 and to attenuate the broadband optical radiation 142 by half (because the broadband optical radiation 142 is unpolarized). The diagnostic light 140 can be attenuated by a variable amount, depending on the angle between the polarization filter 924 and the direction of the polarization vector of the diagnostic light 940. The diagnostic light 940 may not be perfectly polarized, especially after being scattered from the target 110. The polarization of the diagnostic light 940 can depend on the viewing angle of the first and second detection apparatuses 920, 930 relative to a direction of the diagnostic probe 906 and the trajectory. On the other hand, the blocking device 934 is a polarization filter oriented orthogonally to the polarization of the diagnostic light 940 so that only the unpolarized broadband optical radiation 142 passes through to the second detector 932, and moreover, this unpolarized broadband optical radiation 142 would be attenuated by half.

In this implementation, the signals 923, 933 output from the respective detection apparatuses 920, 930 would be very similar to the respective signals 823, 833 shown in FIG. 8, and processing of the signals 923, 933 proceeds similarly to that described with respect to signals 823, 833.

Figure 10:
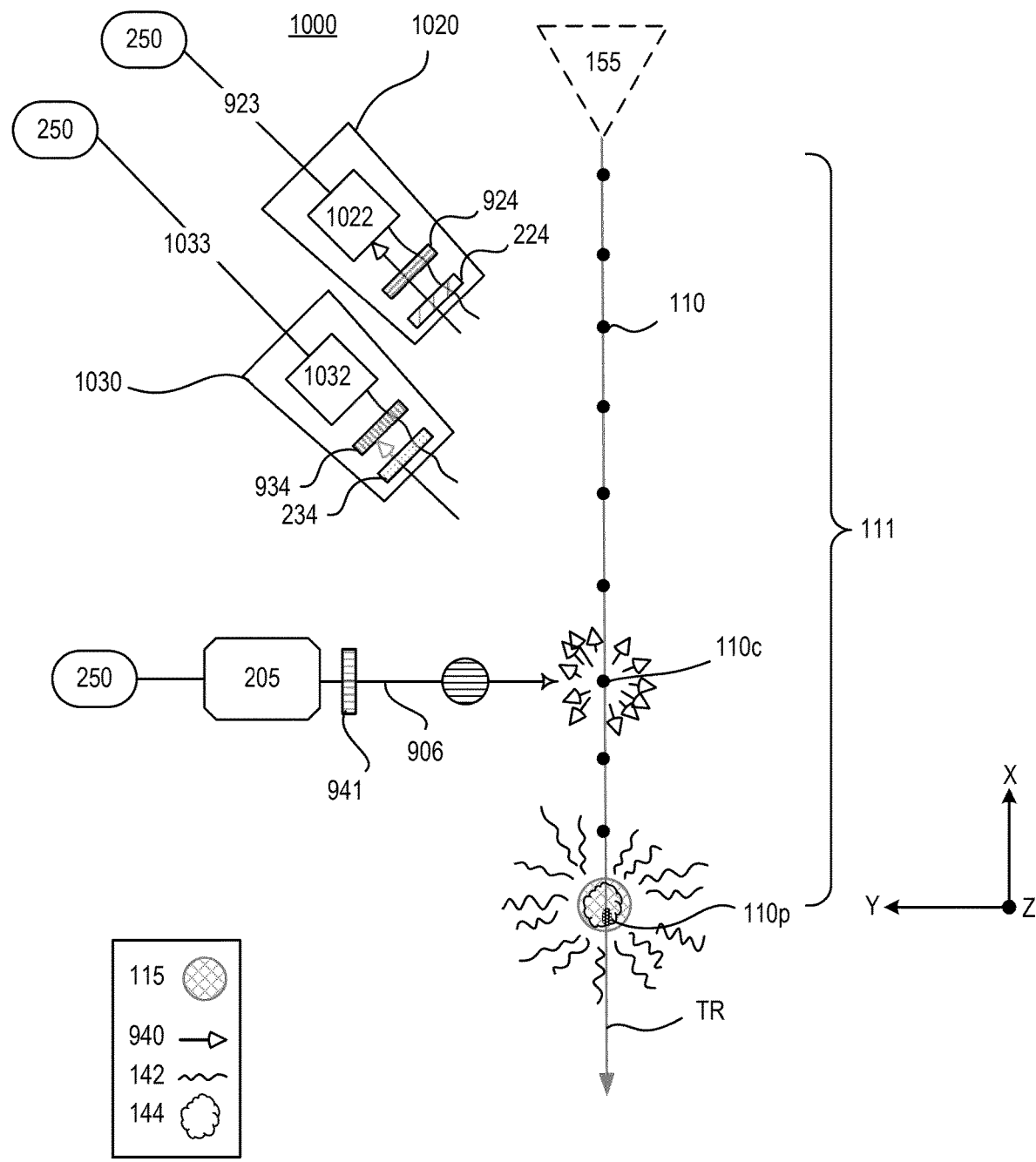
FIG. 10 is a schematic illustration and block diagram of another implementation of the metrology apparatus of FIG. 1A.

In other implementations of a metrology apparatus 1000, as shown in FIG. 10, the blocking devices 224 and 234 implemented in the metrology apparatus 200 shown in FIG. 2 can be designed to each include both a spectral filter (such as spectral filters 224, 234) and a polarization filter (such as polarization filters 924, 934) that are arranged in series and used simultaneously. Such a design can increase the amount of diagnostic light 140 that is blocked by the blocking device 234.

In other implementations, the blocking devices 224, 234 implemented in the metrology apparatus 200 shown in FIG. 2 can be designed as spatial filters instead of as spectral filters. The two spatial positions that can be distinguished are at two slightly different angles from a vector normal to a pupil or entrance of the detection apparatuses 220, 230. Each blocking device 224, 234 includes a lens placed at the location of the pupil, and the two slightly different angles are transformed into positions near the focus of that lens. Each blocking device 224, 234 includes a mask (that defines an opening such as a slit or aperture) that is placed between the lens and the respective light detector 222, 232 such that the diagnostic light 140 passes and the broadband optical radiation 142 is blocked (or vice versa).

Figure 11:
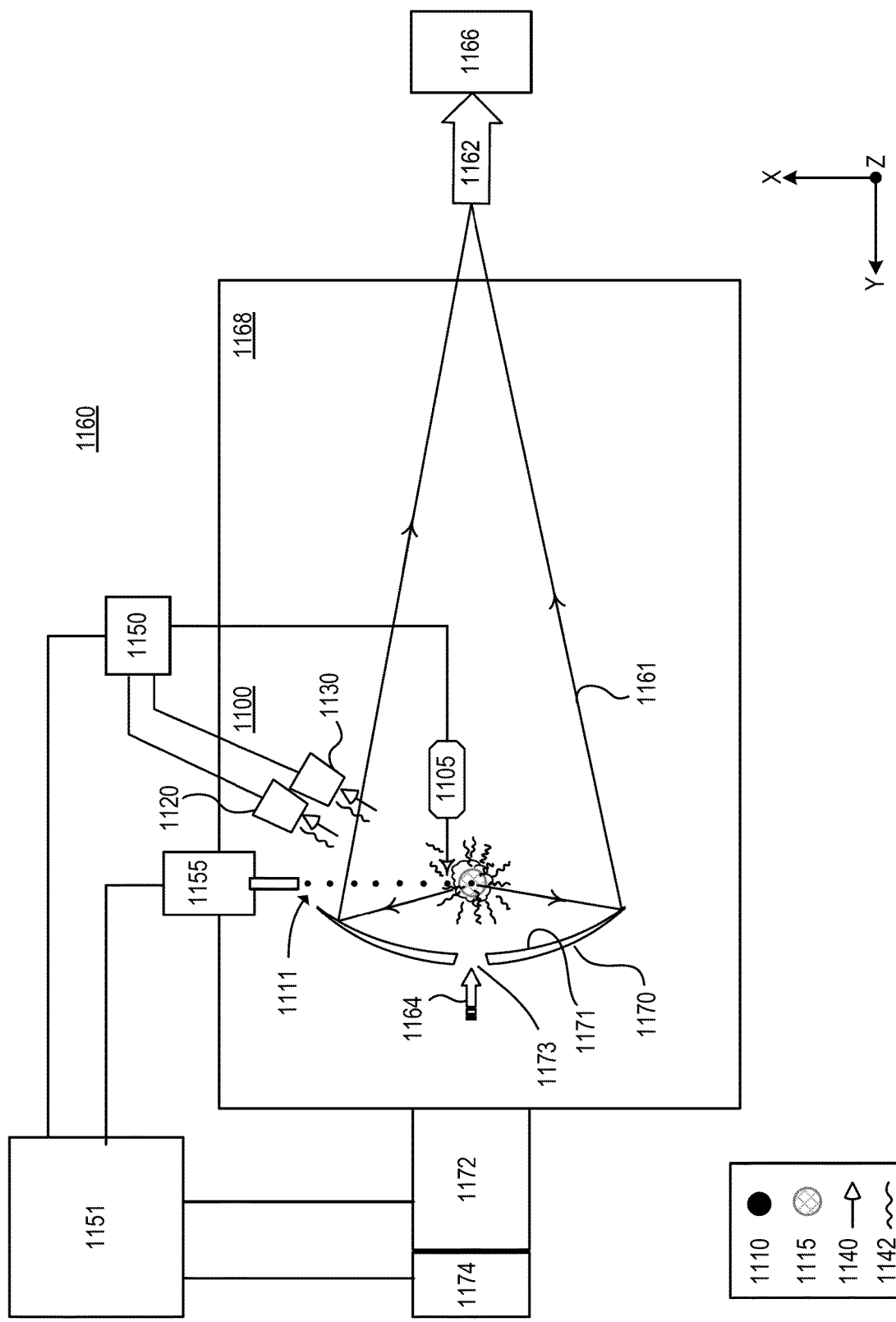
FIG. 11 is a schematic illustration and block diagram of an implementation of an EUV light source that includes an implementation of the metrology apparatus of FIG. 1A.

Referring to FIG. 11, an implementation 1100 of the metrology apparatus 100 is shown in an implementation of an EUV light source 1160. The EUV light source 1160 includes the target delivery system 1155 that directs a stream 1111 of targets 1110 toward the target space 1115 in the chamber 1168. The target space 1115 receives the beam or train of amplified radiation pulses 1164 that are produced from an optical source 1172 (under control of an actuation system 1174). As discussed above, each target 1110 includes matter that emits EUV light 1161 when it is converted into the light-emitting plasma 1144. An interaction between the matter within the target 110 and the radiation pulse 1164 within the target space 1115 converts at least some of the matter in the target 1110 into the light-emitting plasma 1144, and that light-emitting plasma 1144 emits the EUV light 1161. As discussed above, the light-emitting plasma 1144 emits broadband optical radiation 1142, which includes the EUV light 1161 because the light-emitting plasma 1144 has an element with an emission line in the EUV wavelength range.

The light-emitting plasma 1144 can be considered to be a highly ionized plasma with electron temperatures of several tens of electron volts (eV). The higher energy EUV 1161 can be generated with fuel materials (the target 1110) other than tin such as, for example, terbium (Tb) and gadolinium (Gd). The EUV light 1161 generated during de-excitation and recombination of the ions is emitted from the light-emitting plasma 1144, and at least a portion of this EUV light 1161 is collected by an optical element 1170 (the EUV light collector). The EUV light collector 1170 includes a surface 1171 that interacts with at least a portion of the emitted EUV light 1161. The surface 1171 of the EUV light collector 1170 can be a reflective surface that is positioned to receive the portion of the emitting EUV light 1161 and to direct this collected EUV light 1161 for use outside the EUV light source 1160 by an output apparatus 1166, which can be a lithography apparatus. The reflective surface 1171 directs the collected EUV light 1161 to a secondary focal plane, where the EUV light 1161 is then captured for use by the output apparatus 1166. Exemplary lithography apparatuses are discussed with reference to FIGS. 12 and 13.

The reflective surface 1171 is configured to reflect light in the EUV wavelength range and can absorb, diffuse, or block light outside the EUV wavelength range. The EUV light collector 1170 also includes an aperture 1173 that permits the radiation pulses 1164 to pass through the EUV light collector 1170 toward the target space 1115.

The target delivery system 1155 can include a droplet generator arranged within the EUV chamber 1168, and arranged to fire the high frequency stream 1111 of droplets (targets 1110) toward the target space 1115. In operation, the radiation pulses 1164 are delivered in synchronization with the operation of droplet generator, to deliver the radiation pulses 1164 to turn each droplet (each target 1110) into the light-emitting plasma 1144. The frequency of delivery of the droplets can be several kilohertz, for example 50 kHz.

In some implementations, as discussed above with reference to FIG. 5, the energy from the radiation pulses 1164 is instead delivered in at least two pulses: namely, a pre pulse (such as 564A) with limited energy is initially delivered to the droplet at the first target location 515_1 in the target space 1115, in order to vaporize the fuel material into a small cloud, which continues to travel along the trajectory, and then a main pulse (such as 564B) of energy is delivered to the cloud at the second target location 515_2 in the target space 1115, to generate the light-emitting plasma 1144. A trap (which can be, for example, a receptacle) can be provided on the opposite side of the EUV chamber 1168, to capture this fuel (that is, the target matter or the target 1110) that is not, for whatever reason, turned into plasma.

The droplet generator in the target delivery system 1155 includes a reservoir that contains the fuel liquid (for example, molten tin) and a filter and a nozzle. The nozzle is configured to eject droplets of the fuel liquid toward the target space 1115. The droplets of fuel liquid can be ejected from the nozzle by a combination of pressure within the reservoir and a vibration applied to the nozzle by a piezoelectric actuator (not shown).

The metrology apparatus 1100 includes a control system 1150 (such as the control system 150) in communication with the first and second detection apparatuses 1120, 1130 as well as the diagnostic system 1105, which is positioned within the chamber 1168 at an appropriate location to enable the diagnostic probe 1106 to interact with the targets 1110. The EUV light source 1160 includes a control apparatus 1151 that is also in communication with the control system 1150 as well as the other components of the EUV light source 1160, including the optical source 1172, the actuation system 1174, and the target delivery system 1155. As discussed above, the metrology apparatus 1100 is designed to discriminate between the diagnostic light 1140 that is produced from the interaction between the diagnostic probe 1106 and the current target 1110c and the broadband optical radiation 1142 that is emitted from the light-emitting plasma 1144.

Figure 12:
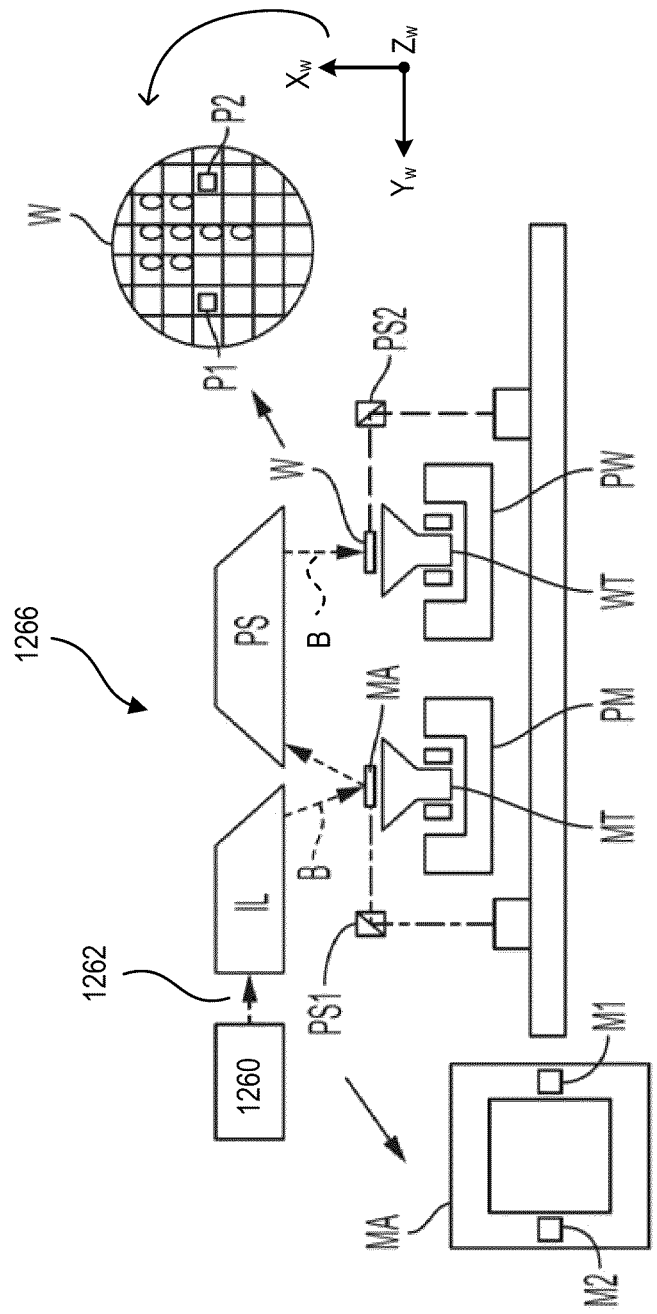
FIG. 12 is a block diagram of an implementation of an EUV light source in which the apparatus of FIG. 1A can be included.

Referring to FIG. 12, in some implementations, the metrology apparatus 100 (or 200, 1100) is implemented within an EUV light source 1260 that supplies EUV light 1262 to a lithography apparatus 1266 (the output apparatus 366). The lithography apparatus 1266 includes an illumination system (illuminator) IL configured to condition a radiation beam B (for example, EUV light 1262); a support structure (for example, a mask table) MT constructed to support a patterning device (for example, a mask or a reticle) MA and connected to a first positioner PM configured to accurately position the patterning device; a substrate table (for example, a wafer table) WT constructed to hold a substrate (for example, a resist coated wafer) W and connected to a second positioner PW configured to accurately position the substrate; and a projection system (for example, a reflective projection system) PS configured to project a pattern imparted to the radiation beam B by patterning device MA onto a target portion C (for example, including one or more dies) of the substrate W.

The illumination system IL can include various types of optical components, such as refractive, reflective, magnetic, electromagnetic, electrostatic or other types of optical components, or any combination thereof, for directing, shaping, or controlling radiation. The support structure MT holds the patterning device MA in a manner that depends on the orientation of the patterning device, the design of the lithographic apparatus, and other conditions, such as for example whether or not the patterning device is held in a vacuum environment. The support structure MT can use mechanical, vacuum, electrostatic or other clamping techniques to hold the patterning device. The support structure MT can be a frame or a table, for example, which can be fixed or movable as required. The support structure MT can ensure that the patterning device is at a desired position, for example, with respect to the projection system PS.

The term "patterning device" should be broadly interpreted as referring to any device that can be used to impart a radiation beam with a pattern in its cross-section such as to create a pattern in a target portion of the substrate. The pattern imparted to the radiation beam can correspond to a particular functional layer in a device being created in the target portion, such as an integrated circuit. The patterning device can be transmissive or reflective. Examples of patterning devices include masks, programmable mirror arrays, and programmable LCD panels. Masks are well known in lithography, and include mask types such as binary, alternating phase-shift, and attenuated phase-shift, as well as various hybrid mask types. An example of a programmable mirror array employs a matrix arrangement of small mirrors, each of which can be individually tilted so as to reflect an incoming radiation beam in different directions. The tilted mirrors impart a pattern in a radiation beam which is reflected by the mirror matrix.

The projection system PS, like the illumination system IL, can include various types of optical components, such as refractive, reflective, magnetic, electromagnetic, electrostatic or other types of optical components, or any combination thereof, as appropriate for the exposure radiation being used, or for other factors such as the use of a vacuum. It can be desired to use a vacuum for EUV radiation since other gases may absorb too much radiation. A vacuum environment can therefore be provided to the whole beam path with the aid of a vacuum wall and vacuum pumps.

As here depicted, the apparatus is of a reflective type (for example, employing a reflective mask).

The lithographic apparatus can be of a type having two (dual stage) or more substrate tables (and/or two or more patterning device tables). In such "multi-stage" machines, the additional tables can be used in parallel, or preparatory steps can be carried out on one or more tables while one or more other tables are being used for exposure.

Figure 13:
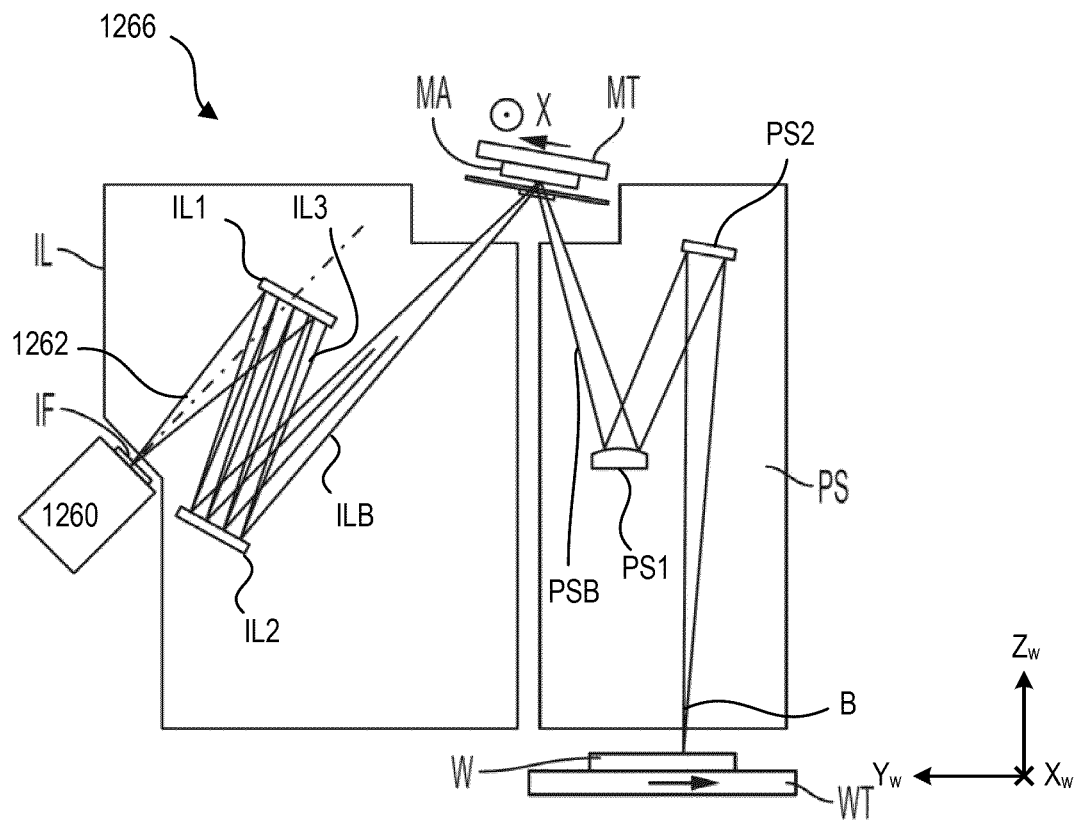
FIG. 13 is a block diagram showing greater detail of the EUV light source of FIG. 12.

Referring also to FIG. 13, the illuminator IL receives the EUV radiation beam (the EUV light 1262) from the EUV light source 1260. Methods to produce EUV light include, but are not necessarily limited to, converting a material into a plasma state that has at least one element, for example, xenon, lithium or tin, with one or more emission lines in the EUV range. In one such method, often termed laser produced plasma ("LPP") the required plasma can be produced by irradiating a fuel, such as a droplet, stream or cluster of material having the required line-emitting element, with a laser beam. The EUV light source 1260 can be designed like the EUV light source 360 or 1160. As discussed above, the resulting plasma 144 or 1144 emits output radiation, for example, EUV radiation 361 or 1161, which is collected using the optical element 370 or 1170.

As shown in both FIGS. 12 and 13, the radiation beam B is incident on the patterning device (for example, mask) MA, which is held on the support structure (for example, mask table) MT, and is patterned by the patterning device. After being reflected from the patterning device (for example, mask) MA, the radiation beam B passes through the projection system PS, which focuses the beam onto a target portion of the substrate W. The coordinate system of the substrate is given by $X_w$, $Y_w$, $Z_w$. With the aid of the second positioner PW and position sensor PS2 (for example, an interferometric device, linear encoder or capacitive sensor), the substrate table WT can be moved accurately, for example, so as to position different target portions in the path of the radiation beam B. Similarly, the first positioner PM and another position sensor PS1 can be used to accurately position the patterning device (for example mask) MA with respect to the path of the radiation beam B. Patterning device (for example mask) MA and substrate W can be aligned using patterning device alignment marks M1, M2 and substrate alignment marks P1, P2.

The depicted apparatus could be used in at least one of the following modes:

1. In step mode, the support structure (for example, mask table) MT and the substrate table WT are kept essentially stationary, while an entire pattern imparted to the radiation beam is projected onto a target portion at one time (that is, a single static exposure). The substrate table WT is then shifted in the $X_w$ and/or $Y_w$ direction so that a different target portion can be exposed.

2. In scan mode, the support structure (for example, mask table) MT and the substrate table WT are scanned synchronously (for example, along the $X_w$ and/or $Y_w$ directions) while a pattern imparted to the radiation beam is projected onto a target portion (that is, a single dynamic exposure). The velocity and direction of the substrate table WT relative to the support structure (for example, mask table) MT may be determined by the (de)magnification and image reversal characteristics of the projection system PS.

3. In another mode, the support structure (for example, mask table) MT is kept essentially stationary holding a programmable patterning device, and the substrate table WT is moved or scanned while a pattern imparted to the radiation beam is projected onto a target portion. In this mode, generally a pulsed radiation source is employed and the programmable patterning device is updated as required after each movement of the substrate table WT or in between successive radiation pulses during a scan. This mode of operation can be readily applied to maskless lithography that utilizes programmable patterning device, such as a programmable mirror array of a type as referred to above.

Combinations and/or variations on the above described modes of use or entirely different modes of use may also be employed.

FIG. 13 shows an implementation of the lithographic apparatus 1266 in more detail, including the EUV light source 1260, the illumination system IL, and the projection system PS. The EUV light source 1260 is constructed and arranged as discussed above when describing EUV light source 360 or 1160.

The systems IL and PS are likewise contained within vacuum environments of their own. The intermediate focus (IF) of the EUV light source 1260 is arranged such that it is located at or near an aperture in an enclosing structure. The virtual source point IF is an image of the radiation emitting plasma (for example, the EUV light 362 or 1162).

From the aperture at the intermediate focus IF, the radiation beam 1262 traverses the illumination system IL, which in this example includes a facetted field mirror device IL1 and a facetted pupil mirror device IL2. These devices form a so-called "fly's eye" illuminator, which is arranged to provide a desired angular distribution of the radiation beam ILB, at the patterning device MA, as well as a desired uniformity of radiation intensity at the patterning device MA (as shown by reference IL3). Upon reflection of the beam ILB at the patterning device MA, held by the support structure (mask table) MT, a patterned beam PSB is formed and the patterned beam PSB is imaged by the projection system PS via reflective elements PS1, PS2 onto a substrate W held by the substrate table WT. To expose a target portion on the substrate W, pulses of radiation B are generated while substrate table WT and patterning device table MT perform synchronized movements in the $X_w$, $Y_w$, $Z_w$ coordinate system to scan the pattern on patterning device MA through the slit of illumination.

Each system IL and PS is arranged within its own vacuum or near-vacuum environment, defined by enclosing structures similar to EUV chamber 1168. More elements than shown may generally be present in illumination system IL and projection system PS. Further, there can be more mirrors present than those shown. For example, there may be one to six additional reflective elements present in the illumination system IL and/or the projection system PS, besides those shown in FIG. 13.

Other aspects of the invention are set out in the following numbered clauses.

1. A method comprising:
enabling an interaction between a diagnostic system and a current target traveling along a trajectory toward a target space, the current target including a component that emits light when converted to plasma;
detecting first light at a first detection region, wherein the first light comprises light emitted from the plasma produced by a previous target and light produced from the enabled interaction between the current target and the diagnostic system;
detecting second light at a second detection region, wherein the second light comprises the light emitted from the previous target's plasma;
producing an analysis signal based on a first signal produced by the detected first light and a second signal produced by the detected second light; and
estimating a property of the current target based on the produced analysis signal.

2. The method of clause 1, wherein the light emitted from the plasma produced by the target component comprises: extreme ultraviolet (EUV) light being in the EUV wavelength range and non-EUV light being outside of the EUV wavelength range.

3. The method of clause 1, wherein detecting second light at the second detection region comprises suppressing at least a portion of the light produced from the interaction between the current target and the diagnostic system.

4. The method of clause 3, wherein suppressing light produced from the interaction between the current target and the diagnostic system comprises filtering the light produced from the interaction between the current target and the diagnostic system based on one or more of: a spectral property, a polarization property, and/or a spatial property of the light produced from the interaction between the current target and the diagnostic system.

5. The method of clause 1, wherein the interaction between the current target and the diagnostic system comprises:
a first interaction between the current target and a first diagnostic probe of the diagnostic system; and
a second interaction between the current target and a second diagnostic probe of the diagnostic system.

6. The method of clause 5, wherein the second interaction between the current target and the second diagnostic probe occurs at a location and time that are distinct from the location and time at which the first interaction between the current target and the first diagnostic probe occurs.

7. The method of clause 1, wherein enabling the interaction between the diagnostic system and the current target comprises directing the diagnostic system toward the current target so that the diagnostic system and the current target interact at a region along the current target trajectory.

8. The method of clause 7, wherein directing the diagnostic system toward the current target comprises directing a diagnostic light beam toward the current target.

9. The method of clause 1, wherein estimating the property of the current target comprises estimating one or more of:
an arrival time of the current target at a particular position in space;
a speed, a velocity, and/or an acceleration of the current target; and a time interval between an arrival of the current target at a particular position in space and an arrival of another target at the particular position in space.

10. The method of clause 1, further comprising adjusting one or more properties of a radiation pulse directed toward the target space if the estimated target property is outside an acceptable specification.

11. The method of clause 1, wherein detecting the first and second light comprises detecting the first and second light during or after a preceding target has interacted with the prior radiation pulse.

12. The method of clause 1, wherein the light emitted from the previous target's plasma has a spectral bandwidth that is substantially broader than a spectral bandwidth of the light produced from the interaction between the current target and the diagnostic system.

13. The method of clause 1, wherein the light produced from the interaction between the current target and the diagnostic system includes light from the diagnostic system that is reflected or scattered from the current target.

14. The method of clause 1, wherein producing the analysis signal from the first signal and the second signal comprises electronically subtracting the second signal from the first signal.

15. The method of clause 1, wherein producing the analysis signal from the first signal and the second signal comprises digitizing the first signal and the second signal, and computing a difference between each time-stamped sample of the second digitized signal and the first digitized signal.

16. The method of clause 1, wherein detecting second light at the second detection region comprises detecting an amount of the light produced from the enabled interaction between the current target and the diagnostic system, wherein the detected amount of the light produced from the enabled interaction between the current target and the diagnostic system at the second detection region is less than an amount of the light produced from the enabled interaction between the current target and the diagnostic system that is detected at the first detection region.

17. An apparatus comprising:
a diagnostic system configured to diagnostically interact with a current target traveling along a trajectory and before the current target enters a target space;
a first detection apparatus configured to detect first light comprising:
light produced from an interaction between the current target and the diagnostic system, and
light emitted from a plasma produced by a previous target;
a second detection apparatus configured to detect second light comprising the light emitted from the plasma produced by the previous target; and
a control system in communication with the first and second detection apparatuses and configured to:
produce an analysis signal based on first and second signals produced from respective outputs of the first and second detection apparatuses; and
estimate a property of the current target based on the produced analysis signal.

18. The apparatus of clause 17, further comprising a target delivery system configured to release a plurality of targets each along a trajectory toward the target space, wherein each target includes a component that emits extreme ultraviolet (EUV) light when converted to plasma;

19. The apparatus of clause 17, further comprising an optical source configured to produce radiation pulses directed toward the target space, wherein the plasma produced by the previous target is produced due to an interaction between the previous target and a prior radiation pulse.

20. The apparatus of clause 17, wherein the diagnostic system comprises a diagnostic light beam, and the diagnostic light produced from the interaction between the current target and the diagnostic light beam comprises the diagnostic light beam that is reflected or scattered from the current target.

21. The apparatus of clause 17, wherein the first detection apparatus comprises a first light detector, and the second detection apparatus comprises a second light detector.

22. The apparatus of clause 21, wherein each of the first light detector and the second light detector comprises one or more: photodiodes, the output of which is a voltage signal related to current produced from the detected light; phototransistors, light-dependent resistors, and photomultiplier tubes.

23. The apparatus of clause 21, wherein the first light detector and the second light detector have approximately equivalent viewing and collection angles.

24. The apparatus of clause 21, wherein the second detection apparatus comprises a blocking device configured to restrict at least most of the light produced from the interaction between the current target and the diagnostic system from reaching the second light detector.

25. The apparatus of clause 24, wherein the blocking device comprises a filter in an optical path between the target space and the second light detector, the filter configured to suppress the light produced from the interaction between the current target and the diagnostic system.

26. The apparatus of clause 25, wherein the filter comprises one or more of: a spectral filter and a polarization filter.

27. The apparatus of clause 21, wherein the first detection apparatus comprises a blocking device having a bandpass that overlaps with a wavelength of the light produced from the interaction between the current target and the diagnostic system.

28. The apparatus of clause 17, wherein the diagnostic system comprises first and second diagnostic probes, each configured to diagnostically interact with the current target as it travels along the trajectory and before entering the target space, each interaction between the current target and a diagnostic probe occurring at a distinct location and a distinct time.

29. The apparatus of clause 17, further comprising:
an optical source configured to produce a plurality of radiation pulses that are directed toward the target space; and
an actuation system in communication with the control system and the optical source, the actuation system configured to adjust one or more properties of a radiation pulse directed toward the target space if the estimated property is outside an acceptable specification.

30. The apparatus of clause 17, wherein the light produced from the interaction between the current target and the diagnostic system has a spectral bandwidth that is substantially narrower than the spectral bandwidth of the light emitted from the plasma produced by the previous target.

31. The apparatus of clause 17, wherein the control system comprises an electronic module in communication with the first and second detection apparatuses, the electronic module configured to electronically subtract the second signal from the first signal.

32. A method of estimating a property of a moving target, the method comprising:
releasing a current target along a trajectory toward a target space, the current target including a component that emits light when converted to plasma;

detecting, at a first detection region, diagnostic light produced from an interaction between the current target and a diagnostic system and background light emitted from the plasma produced by a previous target, the diagnostic light having a substantially narrower spectral bandwidth than the spectral bandwidth of the background light;

restricting an amount of the diagnostic light from passing through to a second detection region and permitting all of the background light to pass through to the second detection region;

detecting the background light at the second detection region;

producing an analysis signal based on:

a signal produced by the detected light at the first detection region, and a background signal produced by the detected light at the second detection region; and estimating a property of the current target based on the produced analysis signal.

33. The method of clause 32, wherein detecting at the first and second detection regions includes detecting the background light at both the first and second detection regions.

34. The method of clause 32, further comprising restricting an amount of background light from passing through to the first detection region, wherein restricting the amount of background light from passing through to the first detection region permits a portion of the background light to reach the first detection region, the permitted portion of the background light being on the same scale in power as the diagnostic light that reaches the first detection region.

What is claimed is:

1. A method comprising:
    enabling an interaction between a diagnostic system and a current target traveling along a trajectory toward a target space, the current target including a component that emits light when converted to plasma;
    detecting first light at a first detection region, wherein the first light comprises light emitted from the plasma produced by a previous target and light produced from the enabled interaction between the current target and the diagnostic system;
    detecting second light at a second detection region, wherein the second light comprises the light emitted from the previous target's plasma;
    producing an analysis signal based on a first signal produced by the detected first light and a second signal produced by the detected second light; and
    estimating a property of the current target based on the produced analysis signal.

2. The method of claim 1, wherein the light emitted from the plasma produced by the target component comprises: extreme ultraviolet (EUV) light being in the EUV wavelength range and non-EUV light being outside of the EUV wavelength range.

3. The method of claim 1, wherein detecting second light at the second detection region comprises suppressing at least a portion of the light produced from the interaction between the current target and the diagnostic system.

4. The method of claim 3, wherein suppressing light produced from the interaction between the current target and the diagnostic system comprises filtering the light produced from the interaction between the current target and the diagnostic system based on one or more of: a spectral property, a polarization property, and/or a spatial property of the light produced from the interaction between the current target and the diagnostic system.

5. The method of claim 1, wherein the interaction between the current target and the diagnostic system comprises:
    a first interaction between the current target and a first diagnostic probe of the diagnostic system; and
    a second interaction between the current target and a second diagnostic probe of the diagnostic system.

6. The method of claim 5, wherein the second interaction between the current target and the second diagnostic probe occurs at a location and time that are distinct from the location and time at which the first interaction between the current target and the first diagnostic probe occurs.

7. The method of claim 1, wherein enabling the interaction between the diagnostic system and the current target comprises directing the diagnostic system toward the current target so that the diagnostic system and the current target interact at a region along the current target trajectory.

8. The method of claim 7, wherein directing the diagnostic system toward the current target comprises directing a diagnostic light beam toward the current target.

9. The method of claim 1, wherein estimating the property of the current target comprises estimating one or more of:
    an arrival time of the current target at a particular position in space;
    a speed, a velocity, and/or an acceleration of the current target; and
    a time interval between an arrival of the current target at a particular position in space and an arrival of another target at the particular position in space.

10. The method of claim 1, further comprising adjusting one or more properties of a radiation pulse directed toward the target space if the estimated target property is outside an acceptable specification.

11. The method of claim 1, wherein detecting the first and second light comprises detecting the first and second light during or after a preceding target has interacted with the prior radiation pulse.

12. The method of claim 1, wherein the light emitted from the previous target's plasma has a spectral bandwidth that is substantially broader than a spectral bandwidth of the light produced from the interaction between the current target and the diagnostic system.

13. The method of claim 1, wherein the light produced from the interaction between the current target and the diagnostic system includes light from the diagnostic system that is reflected or scattered from the current target.

14. The method of claim 1, wherein producing the analysis signal from the first signal and the second signal comprises electronically subtracting the second signal from the first signal.

15. The method of claim 1, wherein producing the analysis signal from the first signal and the second signal comprises digitizing the first signal and the second signal, and computing a difference between each time-stamped sample of the second digitized signal and the first digitized signal.

16. The method of claim 1, wherein detecting second light at the second detection region comprises detecting an amount of the light produced from the enabled interaction between the current target and the diagnostic system, wherein the detected amount of the light produced from the enabled interaction between the current target and the diagnostic system at the second detection region is less than an amount of the light produced from the enabled interaction between the current target and the diagnostic system that is detected at the first detection region.

17. An apparatus comprising:
a diagnostic system configured to diagnostically interact with a current target traveling along a trajectory and before the current target enters a target space;
a first detection apparatus configured to detect first light comprising:
light produced from an interaction between the current target and the diagnostic system, and
light emitted from a plasma produced by a previous target;
a second detection apparatus configured to detect second light comprising the light emitted from the plasma produced by the previous target; and
a control system in communication with the first and second detection apparatuses and configured to:
produce an analysis signal based on first and second signals produced from respective outputs of the first and second detection apparatuses; and
estimate a property of the current target based on the produced analysis signal.

18. The apparatus of claim 17, further comprising a target delivery system configured to release a plurality of targets each along a trajectory toward the target space, wherein each target includes a component that emits extreme ultraviolet (EUV) light when converted to plasma.

19. The apparatus of claim 17, further comprising an optical source configured to produce radiation pulses directed toward the target space, wherein the plasma produced by the previous target is produced due to an interaction between the previous target and a prior radiation pulse.

20. The apparatus of claim 17, wherein the diagnostic system comprises a diagnostic light beam, and the diagnostic light produced from the interaction between the current target and the diagnostic light beam comprises the diagnostic light beam that is reflected or scattered from the current target.

21. The apparatus of claim 17, wherein the first detection apparatus comprises a first light detector, and the second detection apparatus comprises a second light detector.

22. The apparatus of claim 21, wherein each of the first light detector and the second light detector comprises one or more: photodiodes, the output of which is a voltage signal related to current produced from the detected light; phototransistors, light-dependent resistors, and photomultiplier tubes.

23. The apparatus of claim 21, wherein the first light detector and the second light detector have approximately equivalent viewing and collection angles.

24. The apparatus of claim 21, wherein the second detection apparatus comprises a blocking device configured to restrict at least most of the light produced from the interaction between the current target and the diagnostic system from reaching the second light detector.

25. The apparatus of claim 24, wherein the blocking device comprises a filter in an optical path between the target space and the second light detector, the filter configured to suppress the light produced from the interaction between the current target and the diagnostic system.

26. The apparatus of claim 25, wherein the filter comprises one or more of: a spectral filter and a polarization filter.

27. The apparatus of claim 21, wherein the first detection apparatus comprises a blocking device having a bandpass that overlaps with a wavelength of the light produced from the interaction between the current target and the diagnostic system.

28. The apparatus of claim 17, wherein the diagnostic system comprises first and second diagnostic probes, each configured to diagnostically interact with the current target as it travels along the trajectory and before entering the target space, each interaction between the current target and a diagnostic probe occurring at a distinct location and a distinct time.

29. The apparatus of claim 17, further comprising:
an optical source configured to produce a plurality of radiation pulses that are directed toward the target space; and
an actuation system in communication with the control system and the optical source, the actuation system configured to adjust one or more properties of a radiation pulse directed toward the target space if the estimated property is outside an acceptable specification.

30. The apparatus of claim 17, wherein the light produced from the interaction between the current target and the diagnostic system has a spectral bandwidth that is substantially narrower than the spectral bandwidth of the light emitted from the plasma produced by the previous target.

31. The apparatus of claim 17, wherein the control system comprises an electronic module in communication with the first and second detection apparatuses, the electronic module configured to electronically subtract the second signal from the first signal.

32. A method of estimating a property of a moving target, the method comprising:
releasing a current target along a trajectory toward a target space, the current target including a component that emits light when converted to plasma;
detecting, at a first detection region, diagnostic light produced from an interaction between the current target and a diagnostic system and background light emitted from the plasma produced by a previous target, the diagnostic light having a substantially narrower spectral bandwidth than the spectral bandwidth of the background light;
restricting an amount of the diagnostic light from passing through to a second detection region and permitting all of the background light to pass through to the second detection region;
detecting the background light at the second detection region;
producing an analysis signal based on:
a signal produced by the detected light at the first detection region, and
a background signal produced by the detected light at the second detection region; and
estimating a property of the current target based on the produced analysis signal.

33. The method of claim 32, wherein detecting at the first and second detection regions includes detecting the background light at both the first and second detection regions.

34. The method of claim 32, further comprising restricting an amount of background light from passing through to the first detection region, wherein restricting the amount of background light from passing through to the first detection region permits a portion of the background light to reach the first detection region, the permitted portion of the background light being on the same scale in power as the diagnostic light that reaches the first detection region.

* * * * *